(12) United States Patent
Furukawa et al.

(10) Patent No.: US 9,584,307 B2
(45) Date of Patent: Feb. 28, 2017

(54) TRANSMISSION APPARATUS

(71) Applicant: FUJITSU LIMITED, Kawasaki-shi, Kanagawa (JP)

(72) Inventors: Hayato Furukawa, Kawasaki (JP); Wataru Odashima, Oyama (JP); Shota Shinohara, Kawasaki (JP); Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/594,224

(22) Filed: Jan. 12, 2015

(65) Prior Publication Data

US 2015/0132012 A1    May 14, 2015

Related U.S. Application Data

(63) Continuation of application No. PCT/JP2012/068429, filed on Jul. 20, 2012.

(51) Int. Cl.
| | | |
|---|---|---|
| *H04L 7/00* | (2006.01) | |
| *H04J 3/16* | (2006.01) | |
| *H04L 25/14* | (2006.01) | |
| *H04J 3/06* | (2006.01) | |

(52) U.S. Cl.
CPC .......... *H04L 7/0075* (2013.01); *H04J 3/0605* (2013.01); *H04J 3/1652* (2013.01); *H04L 25/14* (2013.01)

(58) Field of Classification Search
CPC ....... H04J 3/0605; H04J 3/1652; H04L 25/14; H04L 7/0075
USPC ........................................................ 370/503
See application file for complete search history.

(56) References Cited

U.S. PATENT DOCUMENTS

| | | | |
|---|---|---|---|
| 8,205,141 B2 | 6/2012 | Caggioni et al. | |
| 2010/0158518 A1 | 6/2010 | Shin et al. | |
| 2010/0215060 A1* | 8/2010 | Haas | H04J 3/0632 370/509 |
| 2010/0229067 A1 | 9/2010 | Ganga et al. | |
| 2010/0281343 A1* | 11/2010 | Caggioni | H03M 13/05 714/776 |

(Continued)

FOREIGN PATENT DOCUMENTS

| | | |
|---|---|---|
| EP | 2456096 A1 | 5/2012 |
| JP | 2004-289567 | 10/2004 |

(Continued)

OTHER PUBLICATIONS

EESR—Extended European Search Report of corresponding European Patent Application No. 12881385.4 dated Jul. 16, 2015.

(Continued)

*Primary Examiner* — Stephen J Clawson
(74) *Attorney, Agent, or Firm* — Fujitsu Patent Center

(57) ABSTRACT

A transmission apparatus includes: a plurality of logical lanes; a receiver configured to receive a signal including synchronization information of a frame; a distributor configured to divide data included in the received signal into frame elements and cause the plurality of logical lanes to store the data; and a transmitter configured to transmit the data stored in the logical lanes to lines corresponding to the logical lanes. When the data is stored in the plurality of logical lanes, the distributor groups the logical lanes into a plurality of groups and associates the frame elements with the synchronization information.

11 Claims, 26 Drawing Sheets

(56) References Cited

U.S. PATENT DOCUMENTS

| 2010/0287449 A1* | 11/2010 | Kubo | H04J 3/1652 |
| | | | 714/775 |
| 2010/0322630 A1* | 12/2010 | Takeuchi | H04J 3/1652 |
| | | | 398/65 |
| 2012/0033748 A1 | 2/2012 | Shimomura | |
| 2013/0089111 A1* | 4/2013 | Ookubo | H04J 3/1652 |
| | | | 370/512 |

FOREIGN PATENT DOCUMENTS

| JP | 2010-148104 | 7/2010 |
| JP | 2012-039448 | 2/2012 |
| JP | 2012-060651 | 3/2012 |

OTHER PUBLICATIONS

International Search Report and Written Opinion of the International Searching Authority (Form PCT/ISA/210, Form PCT/ISA/237), mailed in connection with PCT/JP2012/068429 and mailed Sep. 18, 2012 (5 pages).

JPOA—Office Action of Japanese Patent Application No. 2014-525633 dated Aug. 18, 2015, with English translation of the relevant part, p. 1, lines 28-32.

JPOA—Office Action of Japanese Patent Application No. 2014-525633 dated Mar. 22, 2016, with English translation of the relevant part, p. 1 line 21 to p. 2 line 1.

* cited by examiner

| Column | | | | | |
|---|---|---|---|---|---|
| Row | 1 ... 14 | 15 16 | 17 ... 3824 | 3825 ... 4080 |
| 1 | OTU OH | | | |
| 2 | | OPU OH | Payload | FEC |
| 3 | ODU OH | | | |
| 4 | | | | |

FIG. 2

| Row \ Column | 1 | 17:32 | 33:48 | 49:64 | ... | 4080 |
|---|---|---|---|---|---|---|
| 1 | 1:16 (FAS) | 17:32 | 33:48 | 49:64 | | 4065:4080 |
| 2 | 4081:4096 | 4097:5012 | 5013:5028 | 5029:5044 | | 9145:9160 |
| 3 | 9161:9167 | 9177:9192 | 9193:9208 | 9209:9224 | | 12225:12240 |
| 4 | 12241:12256 | 12257:12272 | 12273:12288 | 12289:13304 | | 16305:16320 |

F I G. 4

| Lane | 1 | ... | 51 | 52 | ... | 103 | ... | 970 | ... | 1020 | 1021 | ... |
|---|---|---|---|---|---|---|---|---|---|---|---|---|
| #01 | 1:16(FAS) | | 16001:16016 | 305:320 | | 289:304 | | 17:32 | | 16017:16032 | 1:16(FAS) | |
| #02 | 17:32 | | 16017:16032 | 1:16(FAS) | | 305:320 | | 33:48 | | 16033:16048 | 17:32 | |
| #03 | 33:48 | | 16033:16048 | 33:48 | | 1:16(FAS) | | 49:64 | | 16049:16064 | 33:48 | |
| #04 | 49:64 | | 16049:16064 | 49:64 | | 33:48 | | 65:80 | | 16065:16080 | 49:64 | |
| #05 | 65:80 | | 16065:16080 | 65:80 | | 49:64 | | 81:96 | | 16081:16096 | 65:80 | |
| #06 | 81:96 | | 16081:16096 | 81:96 | | 65:80 | | 97:112 | | 16197:16112 | 81:96 | |
| #07 | 97:112 | | 16197:16112 | 97:112 | | 81:96 | | 113:128 | | 16113:16128 | 97:112 | |
| #08 | 113:128 | | 16113:16128 | 113:128 | | 97:112 | | 129:144 | | 16129:16144 | 113:128 | |
| #09 | 129:144 | | 16129:16144 | 129:144 | | 113:128 | | 145:160 | | 16133:16160 | 129:144 | |
| #10 | 145:160 | | 16133:16160 | 145:160 | | 129:144 | | 161:176 | | 16145:16176 | 145:160 | |
| #11 | 161:176 | | 16145:16176 | 161:176 | | 145:160 | | 176:192 | | 16177:16192 | 161:176 | |
| #12 | 176:192 | | 16177:16192 | 176:192 | | 161:176 | | 193:208 | | 16193:16208 | 176:192 | |
| #13 | 193:208 | | 16193:16208 | 193:208 | | 176:192 | | 209:224 | | 16209:16224 | 193:208 | |
| #14 | 209:224 | | 16209:16224 | 209:224 | | 193:208 | | 225:240 | | 16225:16240 | 209:224 | |
| #15 | 225:240 | | 16225:16240 | 225:240 | | 209:224 | | 241:256 | | 16241:16256 | 225:240 | |
| #16 | 241:256 | | 16241:16256 | 241:256 | | 225:240 | | 257:272 | | 16257:16272 | 241:256 | |
| #17 | 257:272 | | 16257:16272 | 257:272 | | 241:256 | | 273:288 | | 16273:16288 | 257:272 | |
| #18 | 273:288 | | 16273:16288 | 273:288 | | 257:272 | | 289:304 | | 16289:16304 | 273:288 | |
| #19 | 289:304 | | 16289:16304 | 273:288 | | 273:288 | | 305:320 | | 16305:16320 | 289:304 | |
| #20 | 305:320 | | 16305:16320 | 289:304 | | 273:288 | | 1:16(FAS) | | 16001:16016 | 305:320 | |

FRAME 1 — FRAME 2 — FRAME 3 — FRAME 20 — FRAME 21

F I G. 5

| | 1 | ... | 52 | ... | 103 | ... | 970 | ... | 1021 | ... | 1072 | ... | 1123 | ... |
|---|---|---|---|---|---|---|---|---|---|---|---|---|---|---|
| Lane #01 | 1:16 (FAS) | | 305:320 | | 289:304 | | 17:32 | | 1:16 (FAS) | | 305:320 | | 289:304 | |
| Lane #02 | 17:32 | | 1:16 (FAS) | | 305:320 | | 33:48 | | 17:32 | | 1:16 (FAS) | | 305:320 | |
| Lane #03 | 33:48 | | 33:48 | | 1:16 (FAS) | | 49:64 | | 33:48 | | 33:48 | | 1:16 (FAS) | |
| ... | | | | | ... | | ... | | ... | | ... | | ... | |
| Lane #20 | 305:320 | | 289:304 | | 273:288 | | 1:16 (FAS) | | 305:320 | | 289:304 | | 273:288 | |
| | FRAME 1 | | FRAME 2 | | FRAME 3 | | FRAME 20 | | FRAME 21 | | FRAME 22 | | FRAME 23 | |

SYNCHRONIZATION TIME

F I G. 6

| BANDWIDTH (bps) | OPTICAL MODULE CONFIGURATION | NUMBER OF LOGICAL LANES |
|---|---|---|
| 100G | 10G × 10 | 20 |
| | 25G × 4 | |
| | 100G × 1 | |
| 400G | 10G × 40 | 80 (40) |
| | 25G × 16 | |
| | 40G × 10 | |
| | 50G × 8 | |
| | 100G × 4 | |
| 1T | 10G × 100 | 200 (100) |
| | 25G × 40 | |
| | 40G × 25 | |
| | 50G × 20 | |
| | 100G × 10 | |

FIG. 7

| | 1 | ... | 26 | 51 | 52 | ... | 77 | ... | 102 |
|---|---|---|---|---|---|---|---|---|---|
| | | | | | | | | | ... |
| Lane #01 | 1:16(FAS1) | | 16001:16016 | 15681:15696 | 625:640 | | 305:320 | | 16305:16320 |
| Lane #02 | 17:32 | | 16017:16032 | 15697:15712 | 1:16(FAS1) | | 16001:16016 | | 15681:15696 |
| Lane #03 | 33:48 | | 16033:16048 | 15713:15728 | 17:32 | | 16017:16032 | | 15697:15712 |
| Lane #04 | 49:64 | | 16049:16064 | 15729:15744 | 33:48 | | 16033:16048 | | 15713:15728 |
| ... | ... | | ... | ... | ... | | ... | | ... |
| Lane #19 | 289:304 | | 16289:16304 | 15869:15884 | 273:288 | | 16273:16288 | | 15853:15868 |
| Lane #20 | 305:320 | | 16305:16320 | 15885:15900 | 289:304 | | 16289:16304 | | 15869:15884 |
| Lane #21 | 321:336 | | 1:16(FAS2) | 16001:16016 | 305:320 | | 16305:16320 | | 15885:15900 |
| Lane #22 | 337:352 | | 17:32 | 16017:16032 | 321:336 | | 1:16(FAS2) | | 16001:16016 |
| ... | ... | | ... | ... | ... | | ... | | ... |
| Lane #37 | 577:592 | | 257:272 | 16257:16272 | 561:576 | | 257:272 | | 16241:16256 |
| Lane #38 | 593:608 | | 273:288 | 16273:16288 | 577:592 | | 257:272 | | 16257:16272 |
| Lane #39 | 609:624 | | 289:304 | 16289:16304 | 593:608 | | 273:288 | | 16273:16288 |
| Lane #40 | 625:640 | | 305:320 | 16305:16320 | 609:624 | | 289:304 | | 16289:16304 |
| | FRAME 1 | | | FRAME 2 | | | FRAME 3 | | FRAME 4 |

| | 1990 | 2115 | ... | 2040 | 2041 |
|---|---|---|---|---|---|
| Lane #01 | 17:32 | 16017:16032 | | 15697:15712 | 1:16(FAS1) |
| Lane #02 | 33:48 | 16033:16048 | | 15713:15728 | 17:32 |
| Lane #03 | 49:64 | 16049:16064 | | 15729:15744 | 33:48 |
| Lane #04 | 65:80 | 16065:16080 | | 15745:15760 | 49:64 |
| ... | ... | ... | | ... | ... |
| Lane #19 | 305:320 | 16305:16320 | | 15885:16000 | 289:304 |
| Lane #20 | 321:336 | 1:16(FAS2) | | 16001:16016 | 305:320 |
| Lane #21 | 337:352 | 17:32 | | 16017:16032 | 321:336 |
| Lane #22 | 353:368 | 33:48 | | 16033:16048 | 337:352 |
| ... | ... | ... | | ... | ... |
| Lane #37 | 593:608 | 273:288 | | 16273:16288 | 577:592 |
| Lane #38 | 609:624 | 289:304 | | 16289:16304 | 593:608 |
| Lane #39 | 625:640 | 305:320 | | 16305:16320 | 609:624 |
| Lane #40 | 1:16(FAS1) | 16001:16016 | | 15681:15696 | 625:640 |
| | FRAME 79 | | | FRAME 80 | FRAME 81 |

| | 1 | 26 | ... | 51 | 52 | 77 | ... | 102 |
|---|---|---|---|---|---|---|---|---|
| Lane #01 | 1:16 (FAS1) | 16001:16016 | | 15681:15696 | 625:640 | 305:320 | | 16305:16320 |
| Lane #02 | 17:32 | 16017:16032 | | 15697:15712 | 1:16 (FAS1) | 16001:16016 | | 15681:15696 |
| Lane #03 | 33:48 | 16033:16048 | | 15713:15728 | 17:32 | 16017:16032 | | 15697:15712 |
| Lane #04 | 49:64 | 16049:16064 | | 15729:15744 | 33:48 | 16033:16048 | | 15713:15728 |
| ... | . . . | . . . | | . . . | . . . | . . . | | . . . |
| Lane #19 | 289:304 | 16289:16304 | | 15869:15884 | 273:288 | 16273:16288 | | 15853:15868 |
| Lane #20 | 305:320 | 16305:16320 | | 15885:15900 | 289:304 | 16289:16304 | | 15869:15884 |
| Lane #21 | 321:336 | 1:16 (FAS2) | | 16001:16016 | 305:320 | 16305:16320 | | 15885:16000 |
| Lane #22 | 337:352 | 17:32 | | 16017:16032 | 321:336 | 1:16 (FAS2) | | 16001:16016 |
| ... | . . . | . . . | | . . . | . . . | . . . | | . . . |
| Lane #37 | 577:592 | 257:272 | | 16257:16272 | 561:576 | 257:272 | | 16241:16256 |
| Lane #38 | 593:608 | 273:288 | | 16273:16288 | 577:592 | 257:272 | | 16257:16272 |
| Lane #39 | 609:624 | 289:304 | | 16289:16304 | 593:608 | 273:288 | | 16273:16288 |
| Lane #40 | 625:640 | 305:320 | | 16305:16320 | 609:624 | 289:304 | | 16289:16304 |
| | FRAME 1 | | | FRAME 2 | FRAME 3 | | | FRAME 4 |

F I G. 1 2

| | ... | 970 | ... | 995 | ... | 1020 | 1021 | ... | 1046 | |
|---|---|---|---|---|---|---|---|---|---|---|
| Lane #01 | | 321:336 | | 17:32 | | 16017:16032 | 1:16(FAS1) | | 16001:16016 | |
| Lane #02 | | 337:352 | | 33:48 | | 16033:16048 | 17:32 | | 16017:16032 | |
| Lane #03 | | 353:368 | | 49:64 | | 16049:16064 | 33:48 | | 16033:16048 | |
| Lane #04 | | 369:384 | | 65:80 | | 16065:16080 | 49:64 | | 16049:16064 | |
| . . . | | | | ... | | ... | ... | | ... | |
| Lane #19 | | 625:640 | | 305:320 | | 16305:16320 | 289:304 | | 16289:16304 | |
| Lane #20 | | 1:16(FAS1) | | 16001:16016 | | 15681:15696 | 305:320 | | 16305:16320 | |
| Lane #21 | | 17:32 | | 16017:16032 | | 15697:15712 | 321:336 | | 1:16(FAS2) | |
| Lane #22 | | 33:48 | | 16033:16048 | | 15713:15728 | 337:352 | | 17:32 | |
| . . . | | ... | | ... | | ... | ... | | ... | |
| Lane #37 | | 257:272 | | 16273:16288 | | 15853:15868 | 577:592 | | 257:272 | |
| Lane #38 | | 273:288 | | 16289:16304 | | 15869:15884 | 593:608 | | 273:288 | |
| Lane #39 | | 289:304 | | 16305:16320 | | 15885:16000 | 609:624 | | 289:304 | |
| Lane #40 | | 305:320 | | 1:16(FAS2) | | 16001:16016 | 625:640 | | 305:320 | |
| | | FRAME 39 | | | | FRAME 40 | FRAME 41 | | FRAME 42 | |

LG1: Lane #01 – Lane #20
LG2: Lane #21 – Lane #40

F I G. 1 3

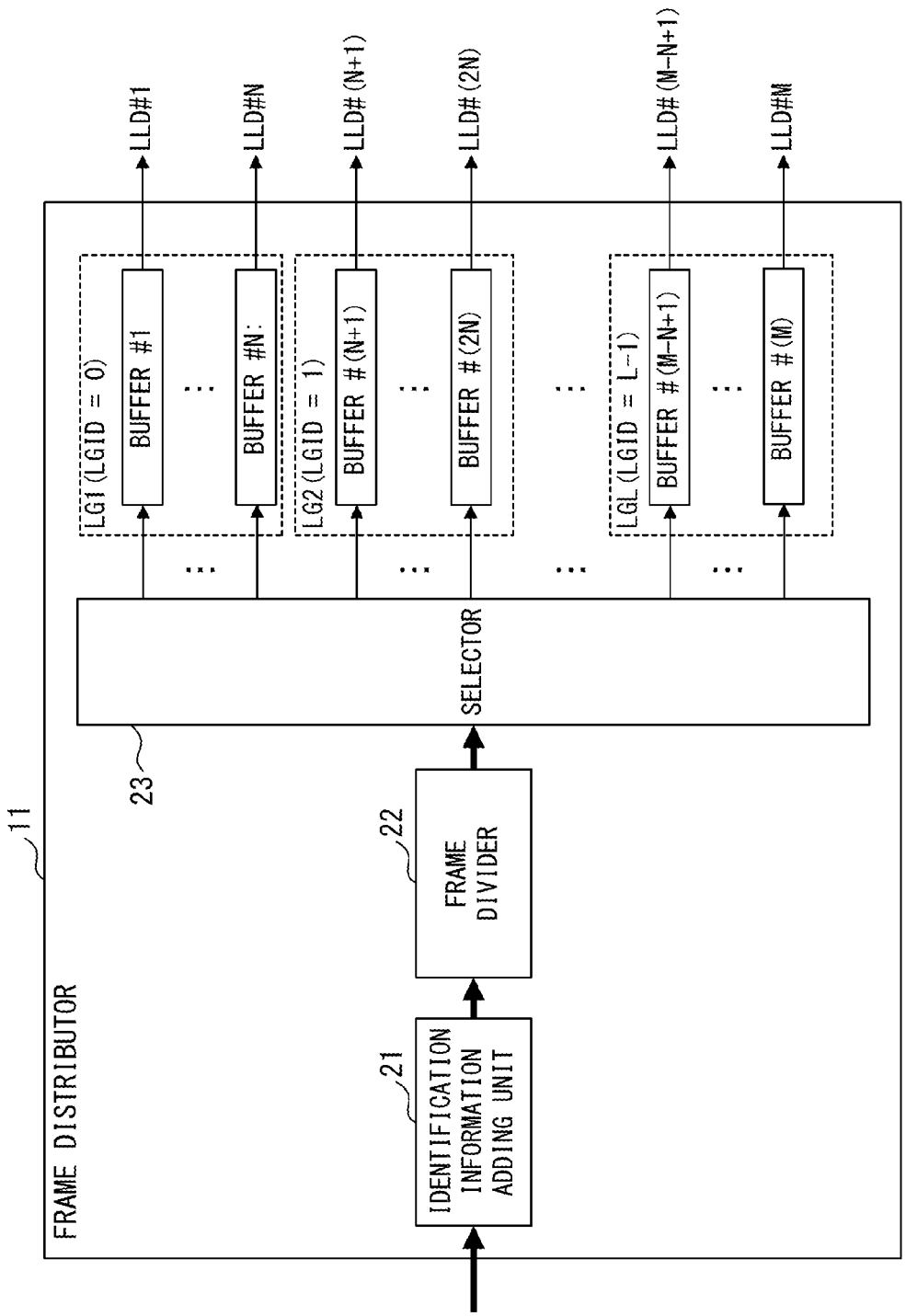
F I G. 14

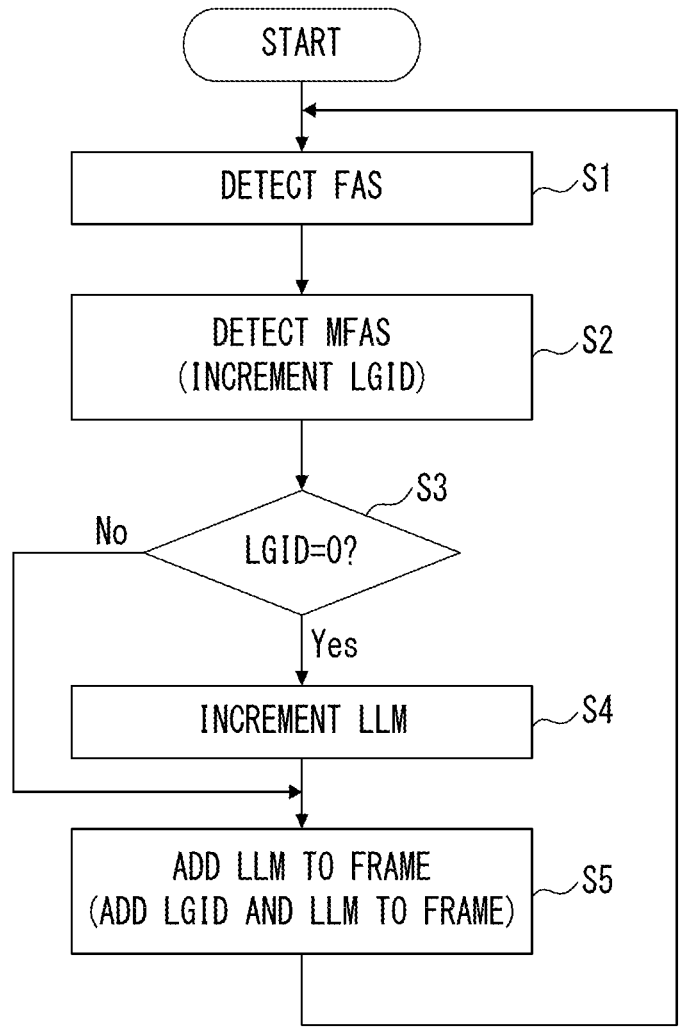
F I G. 15

FIG. 17

| | 1 | ... | 26 | ... | 52 | ... | 77 | ... | 1021 | ... | 1046 | ... | 1072 | ... | 1097 | ... |
|---|---|---|---|---|---|---|---|---|---|---|---|---|---|---|---|---|
| Lane #01 | FAS | | | | | | | | | | | | | | | |
| Lane #02 | | | | | FAS | ... | | | | | | | FAS | ... | | |
| ... | | | | | | | | | | | | | | | | |
| Lane #19 | | | | | | | | | | | | | | | | |
| Lane #20 | | | ... | | | | | | | | | | | | | |
| Lane #21 | | | FAS | | | | | | FAS | | | | | | | |
| Lane #22 | | | ... | | | | FAS | ... | | | FAS | | | ... | FAS | ... |
| ... | | | | | | | | | | | | | | | | |
| Lane #39 | | | ... | | | | ... | | | | ... | | | ... | | ... |
| Lane #40 | | | | | | | | | | | | | | | | |

←—— SYNCHRONIZATION TIME (1020 CYCLE) ——→  ←—— SYNCHRONIZATION TIME (1020 CYCLE) ——→

FIG. 19

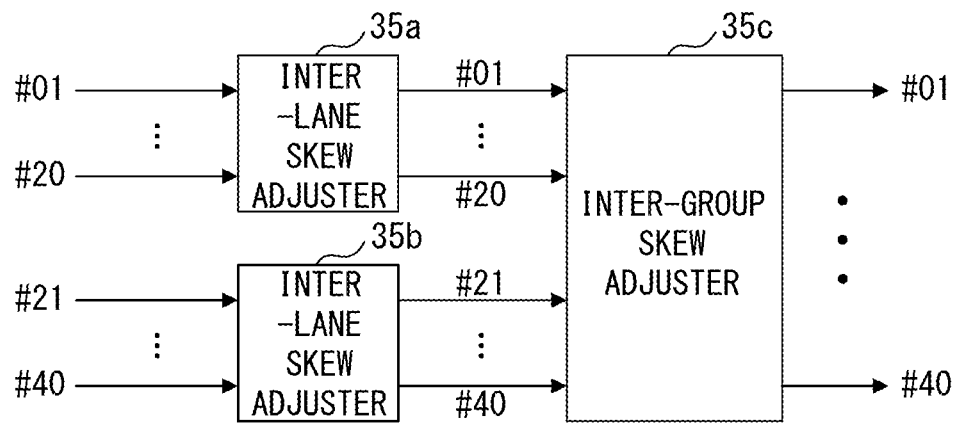
F I G. 2 0 A
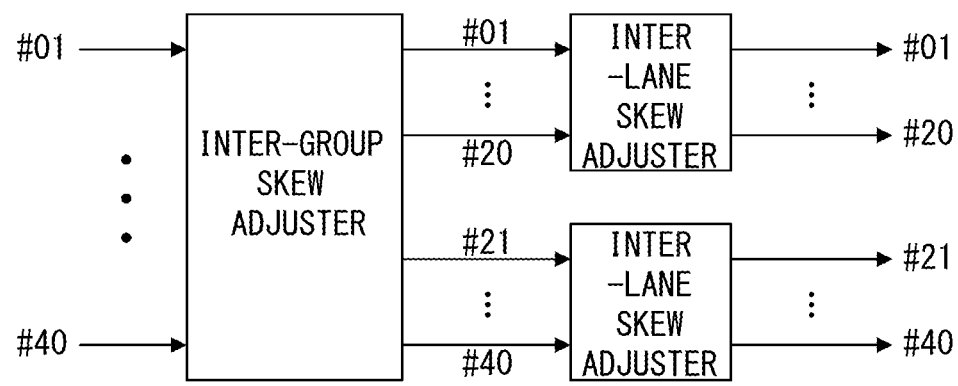
F I G. 2 0 B

| | 1 | ... | 13 | 26 | ... | 39 | ... | 51 |
|---|---|---|---|---|---|---|---|---|
| Lane #01 | 1:16 (FAS1) | | 15361:15376 | 15681:15696 | | 16001:16016 | | 15041:15056 |
| Lane #02 | 17:32 | | 15377:15392 | 15697:15712 | | 16017:16032 | | 15057:15072 |
| ... | | | | | | | | |
| Lane #19 | 289:304 | | 15649:15664 | 15969:15984 | | 16289:16304 | | 15329:15344 |
| Lane #20 | 305:320 | | 15665:15680 | 15985:16000 | | 16305:16320 | | 15345:15360 |
| Lane #21 | 321:336 | | 15681:15686 | 16001:16016 | | 1:16 (FAS4) | | 15361:15376 |
| Lane #22 | 337:352 | | 15697:15702 | 16017:16032 | | 17:32 | | 15377:15392 |
| ... | | | | | | | | |
| Lane #39 | 608:624 | | 15969:15984 | 16289:16304 | | 289:304 | | 15649:15664 |
| Lane #40 | 625:640 | | 15985:16000 | 16305:16320 | | 305:320 | | 15665:15680 |
| Lane #41 | 641:656 | | 16001:16016 | 1:16 (FAS3) | | 321:336 | | 15681:15686 |
| Lane #42 | 657:672 | | 16017:16032 | 17:32 | | 337:352 | | 15697:15702 |
| ... | | | | | | | | |
| Lane #59 | 929:944 | | 16289:16304 | 289:304 | | 609:624 | | 15969:15984 |
| Lane #60 | 945:960 | | 16305:16320 | 305:320 | | 625:640 | | 15985:16000 |
| Lane #61 | 961:976 | | 1:16 (FAS2) | 321:336 | | 641:656 | | 16001:16016 |
| Lane #62 | 977:992 | | 17:32 | 337:352 | | 657:672 | | 16017:16032 |
| ... | | | | | | | | |
| Lane #79 | 1249:1264 | | 289:304 | 609:624 | | 929:944 | | 16289:16304 |
| Lane #80 | 1265:1280 | | 305:320 | 625:640 | | 945:960 | | 16305:16320 |
| | FRAME 1 | | FRAME 2 | FRAME 3 | | FRAME 4 | | |

Lane groups: LG1 (Lanes #01–#20), LG4 (Lanes #21–#40), LG3 (Lanes #41–#60), LG2 (Lanes #61–#80)

F I G. 21

| | 52 | 64 | ... | 77 | ... | 90 | 102 |
|---|---|---|---|---|---|---|---|
| Lane #01 | 1265:1280 | 305:320 | ... | 625:640 | ... | 945:960 | 16305:16320 |
| Lane #02 | 1:16(FAS1) | 15361:15376 | | 15681:15696 | | 16001:16016 | 15005:15020 |
| ... | | | | | | | |
| Lane #19 | 273:288 | 15633:15648 | | 15953:15968 | | 16273:16288 | 15313:15328 |
| Lane #20 | 289:304 | 15649:15664 | | 15969:15984 | | 16289:16304 | 15329:15344 |
| Lane #21 | 305:320 | 15665:15680 | | 15985:16000 | | 16305:16320 | 15345:15360 |
| Lane #22 | 321:336 | 15681:15686 | | 16001:16016 | | 1:16(FAS4) | 15361:15376 |
| ... | | | | | | | |
| Lane #39 | 593:608 | 15953:15968 | | 16273:16288 | | 273:288 | 15633:15648 |
| Lane #40 | 609:624 | 15969:15984 | | 16289:16304 | | 289:304 | 1564915664 |
| Lane #41 | 625:640 | 15985:16000 | | 16305:16320 | | 305:320 | 15665:15680 |
| Lane #42 | 641:656 | 16001:16016 | | 1:16(FAS3) | | 321:336 | 15681:15686 |
| ... | | | | | | | |
| Lane #59 | 913:928 | 16273:16288 | | 273:288 | | 593:608 | 15953:15968 |
| Lane #60 | 929:944 | 16289:16304 | | 289:304 | | 609:624 | 15969:15984 |
| Lane #61 | 945:960 | 16305:16320 | | 305:320 | | 625:640 | 15985:16000 |
| Lane #62 | 961:976 | 1:16(FAS2) | | 321:336 | | 641:656 | 16001:16016 |
| ... | | | | | | | |
| Lane #79 | 1233:1248 | 273:288 | | 593:608 | | 913:928 | 16273:16288 |
| Lane #80 | 1249:1264 | 289:304 | | 609:624 | | 929:944 | 16289:16304 |
| | FRAME 5 | FRAME 6 | | FRAME 7 | | FRAME 8 | |

LG1: Lane #01–#02
LG4: Lane #19–#22, #39–#42
LG3: Lane #41–#42, #59–#62
LG2: Lane #61–#62, #79–#80

F I G. 2 2

| | 970 | ... | 982 | ... | 995 | ... | 1008 | ... | 1020 | ... | 1021 |
|---|---|---|---|---|---|---|---|---|---|---|---|
| Lane #01 | 977:992 | | 17:32 | | 337:352 | | 657:672 | | 16017:16032 | | 1:16(FAS1) |
| Lane #02 | 993:1008 | | 33:48 | | 353:368 | | 673:688 | | 16033:16048 | | 17:32 |
| ... | | | | | | | | | | | |
| Lane #19 | 1265:1280 | | 305:320 | | 625:640 | | 945:960 | | 16305:16320 | | 289:304 |
| Lane #20 | 1:16(FAS1) | | 15361:15376 | | 15681:15696 | | 16001:16016 | | 15041:15056 | | 305:320 |
| Lane #21 | 17:32 | | 15377:15392 | | 15697:15712 | | 16017:16032 | | 15057:15072 | | 321:336 |
| Lane #22 | 33:48 | | 15393:15408 | | 15713:15728 | | 16033:16048 | | 15073:15052 | | 337:352 |
| ... | | | | | | | | | | | |
| Lane #39 | 305:320 | | 15665:15680 | | 15985:16000 | | 16305:16320 | | 15345:15360 | | 608:624 |
| Lane #40 | 321:336 | | 15681:15686 | | 16001:16016 | | 1:16(FAS4) | | 15361:15376 | | 625:640 |
| Lane #41 | 337:352 | | 15697:15702 | | 16017:16032 | | 305:320 | | 15377:15392 | | 641:656 |
| Lane #42 | 353:368 | | 15703:15718 | | 16033:16048 | | 321:336 | | | | 657:672 |
| ... | | | | | | | | | | | |
| Lane #59 | 625:640 | | 15985:16000 | | 16305:16320 | | 305:320 | | 15665:15680 | | 929:944 |
| Lane #60 | 641:656 | | 16001:16016 | | 1:16(FAS3) | | 321:336 | | 15681:15686 | | 945:960 |
| Lane #61 | 657:672 | | 16017:16032 | | 17:32 | | 337:352 | | 15697:15702 | | 961:976 |
| Lane #62 | 673:688 | | 16033:16048 | | 33:48 | | 353:368 | | | | 977:992 |
| ... | | | | | | | | | | | |
| Lane #79 | 945:960 | | 16305:16320 | | 305:320 | | 625:640 | | 15985:16000 | | 1249:1264 |
| Lane #80 | 961:976 | | 1:16(FAS2) | | 321:336 | | 641:656 | | 16001:16016 | | 1265:1280 |
| | FRAME 77 | | FRAME 78 | | FRAME 79 | | FRAME 80 | | | | FRAME 81 |

LG1: Lane #01–#02, ..., #19–#20
LG4: Lane #21–#22, ..., #39–#40
LG3: Lane #41–#42, ..., #59–#60
LG2: Lane #61–#62, ..., #79–#80

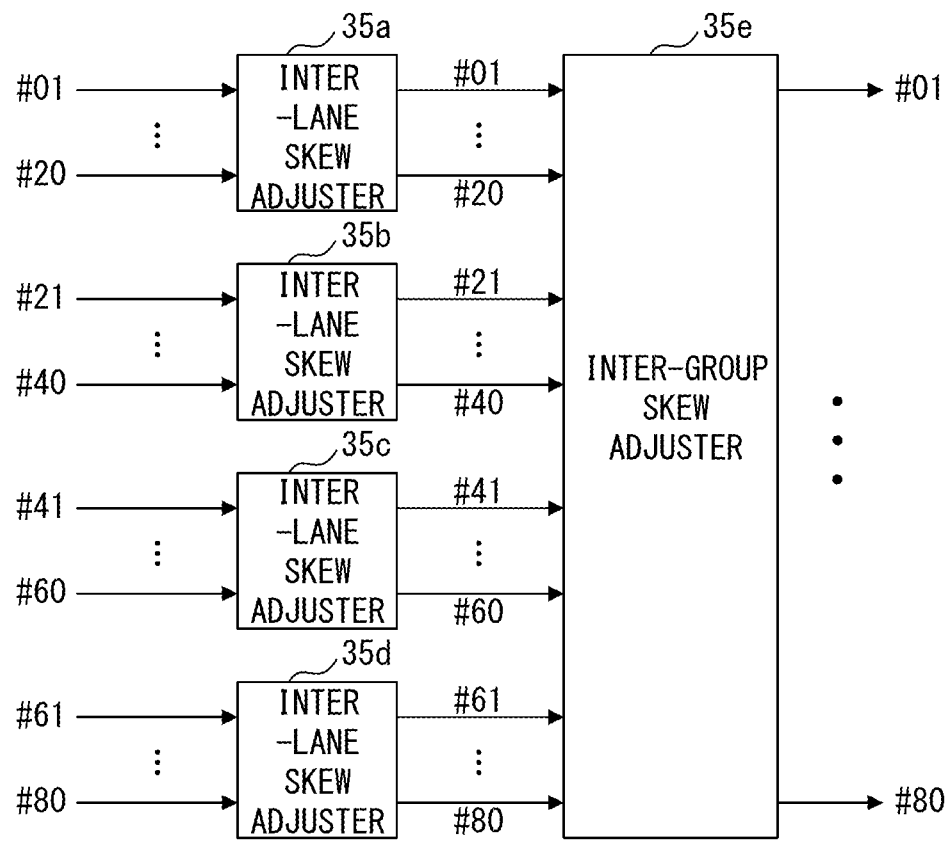
F I G. 2 6

TRANSMISSION APPARATUS

CROSS-REFERENCE TO RELATED APPLICATION

This application is a continuation application of International Application PCT/JP2012/068429 filed on Jul. 20, 2012 and designated the U.S., the entire contents of which are incorporated herein by reference.

FIELD

The embodiments discussed herein are related to a transmission apparatus that transmits signals in an optical network.

BACKGROUND

OTN (Optical Transport Network), which are recommended by the ITU (International Telecommunication Union), have been known as one of the standards for transmitting signals in an optical network (e.g., core network). In OTN, client data is stored in OTU (Optical channel Transport Unit) frames and is transmitted.

As a related art, there is a transmission apparatus that transmits an Ethernet (Registered Trademark) signal by using plural OTU2 signals. Note that Japanese Laid-Open Patent Application Publication No. 2010-148104 is known as related art.

In recent years, further increases in speed and capacity have been needed in optical networks. For that reason, in OTU, a configuration that parallelizes signals before processing and transmitting the signals has been put into practical use.

However, in a transmission system that parallelizes signals before processing and transmitting them, the time to process frames may become longer when an attempt is made to increase the transmission rate. For example, a time needed to establish synchronization may become longer in the transmission apparatus at the receiver end.

SUMMARY

According to an aspect of the invention, a transmission apparatus includes: a plurality of logical lanes; a receiver configured to receive a signal including synchronization information of a frame; a distributor configured to divide data included in the received signal into frame elements and cause the plurality of logical lanes to store the data; and a transmitter configured to transmit the data stored in the logical lanes to lines corresponding to the logical lanes. When the data is stored in the plurality of logical lanes, the distributor groups the logical lanes into a plurality of groups and associates the frame elements with the synchronization information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a structure of an OTU frame;

FIG. 4 is a diagram explaining a method to divide an OTU frame;

FIG. 5 is a diagram explaining a method to distribute an OTU frame into plural logical lanes;

FIG. 6 is a diagram explaining synchronization of logical lanes;

FIG. 7 is a diagram illustrating a relationship between the transmission bandwidth and the number of logical lanes:

FIG. 8 is a diagram (1) to explain a method to distribute an OTU frame to 40 logical lanes;

FIG. 9 is a diagram (2) to explain a method to distribute an OTU frame to 40 logical lanes;

FIG. 12 is a diagram (1) illustrating an example of distribution by the frame distributor;

FIG. 13 is a diagram (2) illustrating an example of distribution by the frame distributor;

FIG. 14 illustrates a configuration of the frame distributor;

FIG. 15 is a flowchart illustrating the processing in the identification information adding unit;

FIG. 17 is a diagram explaining synchronization in the transmission apparatus of the embodiment;

FIG. 19 is a diagram explaining operations of the logical lane rearranging unit;

FIGS. 20A and 20B illustrate configurations of the skew adjuster;

FIG. 21 is a diagram (1) illustrating an example of distribution in the configuration including 80 logical lanes;

FIG. 22 is a diagram (2) illustrating an example of distribution in the configuration including 80 logical lanes;

FIG. 23 is a diagram (3) illustrating an example of distribution in the configuration including 80 logical lanes;

FIG. 24 is a diagram explaining synchronization in the configuration including 80 logical lanes;

FIG. 25 is a diagram explaining operations of a logical lane rearranging unit in a transmission apparatus including 80 logical lanes; and FIG. 26 is a diagram illustrating a configuration of a skew adjuster in a transmission apparatus including 80 logical lanes.

DESCRIPTION OF EMBODIMENTS

Figure 1:
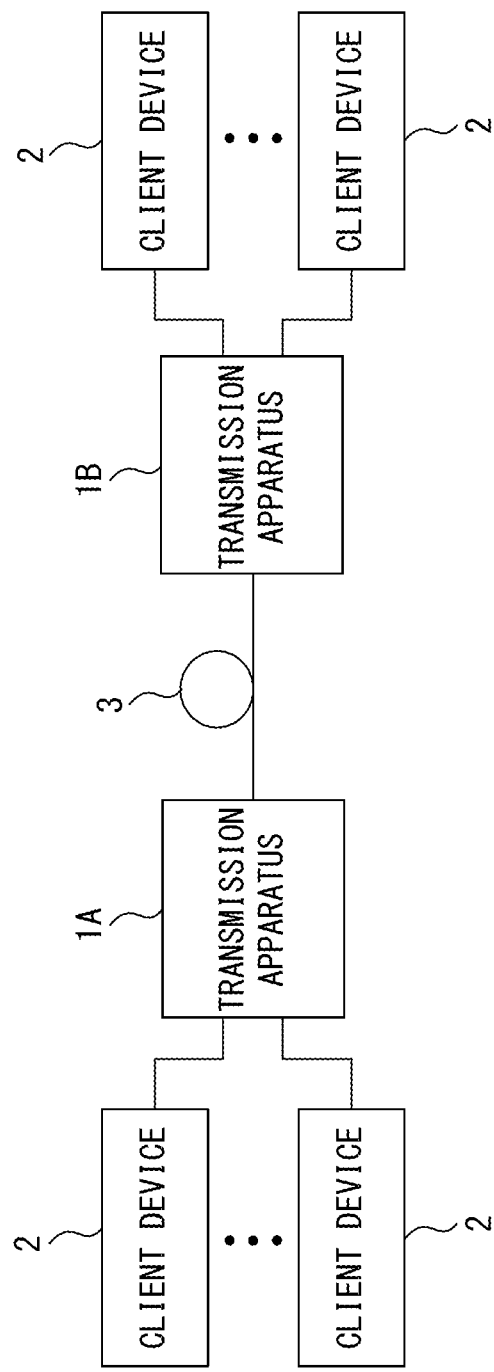
FIG. 1 illustrates an example of an optical transmission system in which a transmission apparatus of the embodiments of the present invention is used.

FIG. 1 illustrates an example of an optical transmission system in which a transmission apparatus of the embodiments of the present invention is used. Transmission apparatuses 1A and 1B can respectively accommodate a client device 2. The transmission apparatuses 1A and 1B are connected to each other by an optical transmission path 3.

The transmission apparatus (transmitter) 1A generates frames to store client data that is transmitted from the client device 2. The transmission apparatus 1A transmits the frames to the transmission apparatus 1B through the optical transmission path 3. The transmission apparatus (receiver) 1B reproduces the client data from the frames received from the transmission apparatus 1A. Then the transmission apparatus 1B transfers the reproduced client data to a corresponding client device 2.

In the following descriptions, the transmission apparatus 1A may be referred to as a transmitter-end transmission apparatus. The transmission apparatus 1B may be referred to as a receiver-end transmission apparatus. However, the transmission apparatus 1B may have a function of transmitting an optical signal to the transmission apparatus 1A. The transmission apparatus 1A may have a function of receiving the optical signal from the transmission apparatus 1B.

The frame transmitted between the transmission apparatuses 1A and 1B is OTU frame recommended by ITU. The client data is stored in a payload section of an OTU frame and is transmitted.

FIG. 2 illustrates a structure of an OTU frame. An OTU frame has a structure of 4080 bytes×4 rows as illustrated in FIG. 2. In 1st to 16th bytes, monitoring control information is stored. The monitoring control information includes an OTU overhead, an ODU (Optical channel Data Unit) overhead, and an OPU (Optical channel Payload Unit) overhead. 17th to 3824th bytes are a payload section in which client data is stored. FEC (Forward Error Correction) is inserted into 3825th to 4080th bytes.

A transmission apparatus that supports OTU can transmit plural optical signals in parallel. For example, a transmission apparatus that supports OTU3 performs parallel transmission by using four 10 Gbps optical interfaces. A transmission apparatus that supports OTU4 performs parallel transmission by using ten 10 Gbps optical interfaces (or four 25 Gbps optical interfaces).

Figure 3:
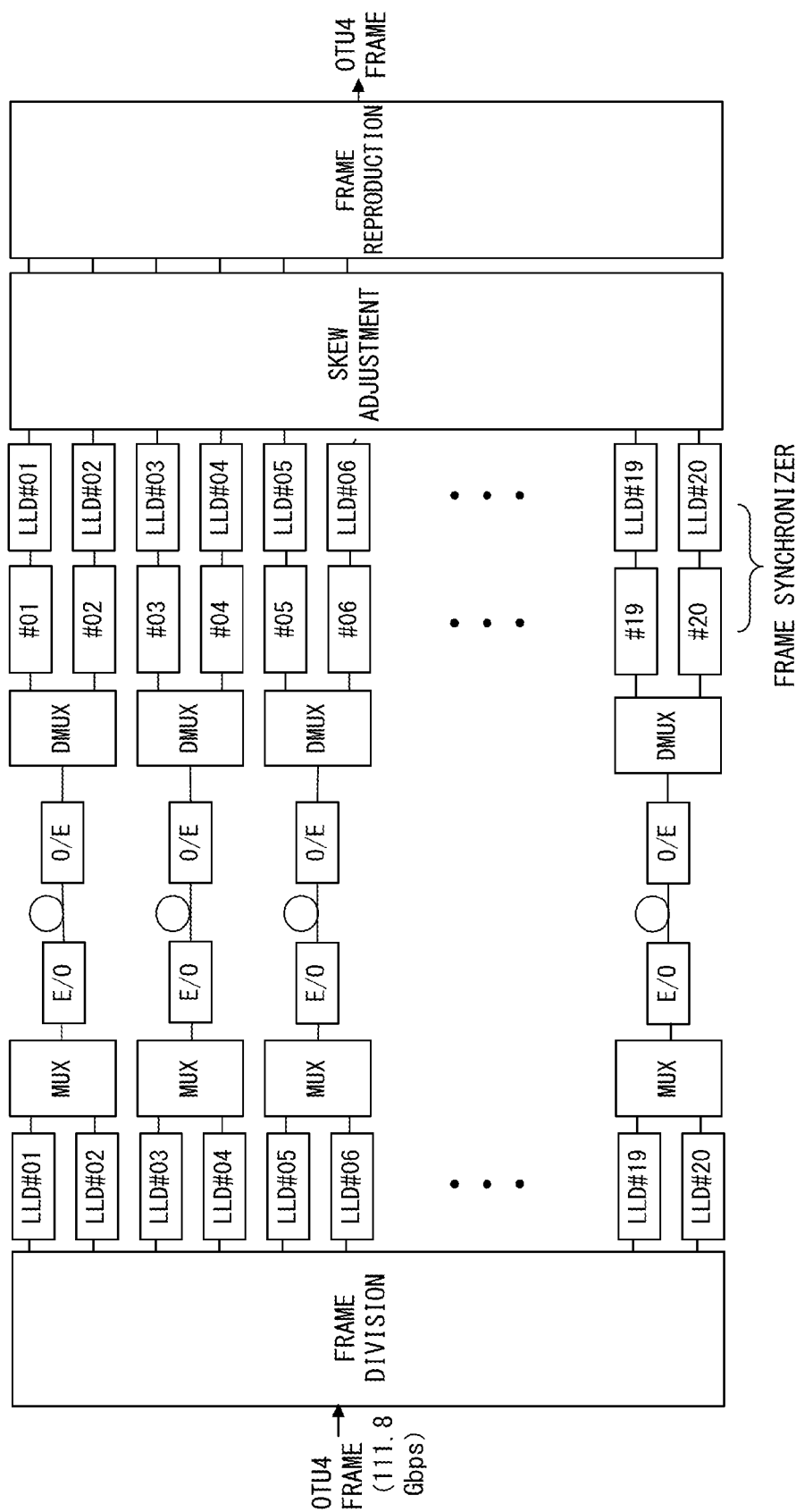
FIG. 3 is a diagram explaining the parallel transmission of OTU.

FIG. 3 is a diagram explaining the parallel transmission of OTU. In the example illustrated in FIG. 3, an OTU4 frame of approximately 100 Gbps is transmitted via ten 10 Gbps optical interfaces.

In this case, at the transmitter end, the OTU frame is converted into a number of logical lanes. This conversion may be referred to as Logical Lane Distribution (LLD). A logical lane is each data sequence after an OTU frame is parallelized every 16 bytes. The number of the logical lanes is standardized in ITU-T (recommendation G.709). For example, four logical lanes are the standards for OTU3 and 20 logical lanes are the standards for OTU4.

A multiplexer (MUX) multiplexes signals in the plural logical lanes to convert the logical lanes into the optical interfaces. In FIG. 3, the signals in every two logical lanes are multiplexed for 20 logical lanes to generate signals for 10 optical interfaces. An optical module (E/O) converts the multiplexed signal into an optical signal and outputs the optical signal. In this example, the bit rate of each optical signal is approximately 10 Gbps.

At the receiver end, the signal in each logical lane is reproduced by an optical module (O/E) and a demultiplexer (DMUX). A frame synchronizer establishes synchronization for each logical lane. A skew adjuster compensates for the differences in timing (i.e., skew) between the logical lanes. A frame reproducer reproduces OTU frames from the output signals of the plural logical lanes.

In the above parallel transmission, an OTU frame is divided at every 16 bytes and is distributed to plural logical lanes, as illustrated in FIG. 4. In the following descriptions, OTU frame is divided at every 16 bytes. In this case, each piece of 16-byte data is referred to as a "frame element" in this specification. In other words, an OTU frame is divided into 255×4 frame elements. Moreover, in FIG. 4, the two numbers in each frame element represent the head and end positions of the frame element. For example, "1:16" indicates that the frame element stores information of the 1st to the 16th bytes of an OTU frame.

Frame synchronization is established by FAS (Frame Alignment Signal) within an OTU overhead. FAS is 6-byte information that has predetermined data patterns (e.g., F6 F6 F6 28 28 28). Here, the OTU overhead is stored in the 1st to the 14th bytes in the 1st row of an OTU frame, as illustrated in FIG. 2. Therefore when the OTU frame is divided into frame elements, FAS is allocated to the frame element "1:16" as in FIG. 4.

FIG. 5 is a diagram explaining a method to distribute an OTU frame into plural logical lanes. The OTU frame is divided into frame elements illustrated in FIG. 4, and is sequentially distributed to the logical lanes #01 to #20. At that time, the frame elements in the 1st row are sequentially distributed to the logical lanes #01 to #20, and the frame elements in the 2nd, the 3rd, and the 4th rows are sequentially distributed to the logical lanes #01 to #20. For example, in the first cycle, frame elements "1:16" to "305:320" are distributed to the logical lanes #01 to #20. It should be noted that "cycle" corresponds to a period of time for transmitting 16-byte information in each logical lane.

An OTU frame stores information of 16320 bytes as illustrated in FIG. 4. Therefore in a configuration in which an OTU frame is distributed to the logical lanes #01 to #20, the OTU frame is transmitted in 51 cycles as illustrated in FIG. 5. At that time, the end portion of the OTU frame (i.e., frame element "16305:16320" is distributed to the logical lane #20.

As described above, one OTU frame is transmitted in cycles in the logical lanes #01 to #20. Thus, as illustrated in FIG. 5, when an OTU frame (hereinafter referred to as OTU frame 1) is transmitted in the 1st to the 51st cycles, the next OTU frame (hereinafter referred to as OTU frame 2) is transmitted in the 52nd to the 102nd cycles.

Frame synchronization is established by FAS as described above. In the example illustrated in FIG. 5, FAS of the OTU frame 1 is allocated to the logical lane #01. However, in a transmission scheme in which an OTU frame is distributed into plural logical lanes, synchronization needs to be established in each logical lane. In other words, FAS needs to be allocated to each logical lane.

For that reason, when a transmission apparatus distributes the OTU frame 2 to the logical lanes #01 to #20, it allocates the head portion of the OTU frame (i.e., frame element "1:16") in the logical lane #02. In other words, the OTU frame 2 is started from the logical lane #02 as illustrated in FIG. 5. Similarly, distribution of an OTU frame 3, for example, is started from the logical lane #03, and distribution of an OTU frame 20 is started from the logical lane #20. It should be noted that processing to shift the distribution start lane by one for each OTU frame is referred to as "rotation" in this specification.

LLM (Logical Lane Marker) is added to FAS to establish frame synchronization. LLM is incremented by one every time the rotation is carried out. For example, in FIG. 5, when LLM added to FAS of the OTU frame 1 is "0", LLM in the OTU frame 2 becomes "1", and LLM in the OTU frame 3 becomes "2". LLM is used to identify the logical lane in the transmission apparatus at the receiver end.

As described above, in the transmission method in which an OTU frame is distributed to plural logical lanes, the rotation is carried out so that FAS is sequentially allocated to each logical lane. The transmission apparatus at the receiver end establishes synchronization for each logical lane by using FAS, and identifies each logical lane number by using LLM. Then, by multiplexing data in each logical lane with respect to frame elements, the OTU frame is reproduced.

FIG. 6 is a diagram explaining synchronization of logical lanes. The synchronization of logical lanes is established by detecting FAS at constant intervals in each logical lane. For example, in the transmission scheme that includes 20 logical lanes #01 to #20, as illustrated in FIG. 5 and FIG. 6, FAS is inserted at 20 OTU frame intervals (i.e., 1020 cycles) in each logical lane. As a result, the transmission apparatus at the receiver end decides that synchronization of each logical lane is established when FAS is detected in each logical lane in 1020 cycles.

Further increase in speed and capacity has been requested in optical networks. For that reason, a configuration to increase the number of optical signals transmitted in parallel has also been studied in OTU.

For example, the bit rate of OTU4, which has been placed into practical use, is approximately 100 Gbps. In regard to this point, OTU transmission schemes that have 400 Gbps and 1 Tbps bandwidths are currently being studied. However, according to the current technology, increases in the speed of an optical module (an E/O device and an O/E device) are limited. For that reason, ultrahigh-speed transmission can be achieved by parallelizing optical modules of 10 Gbps to 100 Gbps, as illustrated in FIG. 7.

Transmission at 100 Gbps can be achieved by "10 Gbps× 10", "25 Gbps×4" or "100 Gbps×1", for example. Here, "10 Gbps×10" represents a configuration of parallelizing ten 10 Gbps optical modules. The other notations are to be interpreted in a similar manner. In order for the transmission apparatus to support the above-described three configurations, the number of logical lanes in the transmission apparatus needs to be the least common multiple of the number of parallelized optical modules. Therefore, in order to provide 100 Gbps transmission by using OTU, twenty logical lanes are provided in the transmission apparatus, as illustrated in FIG. 3 or FIG. 5.

A transmission at 400 Gbps is expected to be achieved by such configurations as "10 Gbps×40", "25 Gbps×16", "40 Gbps×10", "50 Gbps×8", or "100 Gbps×4". Here, the least common multiple of 40, 16, 10, 8, and 4 is 80. Therefore the number of logical lanes is 80 in this case. However, when the transmission apparatus does not support "25 Gbps×16", the number of logical lanes may be 40.

A transmission at 1 Tbps is expected to be achieved by such configurations as "10 Gbps×100", "25 Gbps×40", "40 Gbps×25", "50 Gbps×20", or "100 Gbps×10". Here, the least common multiple of 100, 40, 25, 20, and 10 is 200. Therefore the number of logical lanes is 200 in this case. However, when the transmission apparatus does not support "25 Gbps×40", the number of logical lanes may be 100.

However, the processing time of an OTU frame in the transmission apparatus at the receiver end may become longer when the number of logical lanes increases. For example, when the number of logical lanes increases from 20 to 40 as the transmission rate increases from 100 Gbps to 400 Gbps, the time needed for frame synchronization becomes longer.

FIG. 8 to FIG. 9 are diagrams explaining a method to distribute an OTU frame to forty logical lanes. In this case, in the first cycle, the frame elements "1:16" to "625:640" in the OTU frame 1 are distributed to the logical lanes #01 to #40. Subsequently, frame elements are sequentially distributed in a similar manner to the logical lanes #01 to #40. As a result, the last frame element of the OTU frame 1 (i.e., the frame element "16305:16320") is distributed to the logical lane #20 of the 26th cycle.

At that time, no frame elements are distributed to the logical lanes #21 to #40 of the 26th cycle. For that reason, the first frame element of the OTU frame 2 (i.e., the frame element "1:16") is to be distributed to the logical lane #21 of the 26th cycle. In other words, the last frame element of the OTU frame 1 and the first frame element of the OTU frame 2 are allocated in the same cycle. In this case, the rotation is not carried out when the processing shifts from the OTU frame 1 to the OTU frame 2.

Afterwards, the remaining frame elements of the OTU frame 2 are sequentially distributed to the logical lanes. As a result, the last frame element of the OTU frame 2 (i.e., the frame element "16305:16320") is distributed to the logical lane #40.

At that time, a frame element is distributed to each of all the logical lanes #01 to #40 in the 51st cycle. For that reason, the first frame element of the OTU frame 3 is allocated to the next cycle (i.e., the 52nd cycle). In other words, the last frame element of the OTU frame 2 and the first frame element of the OTU frame 3 are allocated to different cycles. In this case, when the distribution of the OTU frame 3 to the logical lanes is started, the rotation is carried out. For example, the first frame element of the OTU frame 3 (i.e., the frame element "1:16") is allocated to the logical lane #02 rather than the logical lane #01. Subsequently, the remaining frame elements of the OTU frame 3 and the frame elements of the subsequent OTU frame are distributed in a similar manner to the logical lane #01 to #40.

As described above, in the example illustrated in FIG. 8 and FIG. 9, every time two OTU frames are distributed to the logical lanes #01 to #40, the rotation is carried out. In the following descriptions, FAS of the first OTU frame after the rotation is referred to as "FAS1" and FAS of the second OTU frame is referred to as "FAS2".

In this case, FAS1 of the OTU frames 1, 3, 5, . . . are sequentially allocated to the logical lanes #01, #02, #03, . . . . FAS1 of the OTU frame 79 is allocated to the logical lane #40. On the other hand, FAS2 of the OTU frames 2, 4, 6, . . . are sequentially allocated to the logical lanes #21, #22, #23, . . . . Then FAS2 of the OTU frame 80 is allocated to the logical lane #20.

As described above, in the example illustrated in FIG. 8 and FIG. 9, in each logical lane, FAS1 is inserted every 2040 cycles. Similarly, in each logical lane, FAS2 is inserted every 2040 cycles.

Here, LLM is added to FAS for establishing frame synchronization as described above. LLM is incremented by one every time the rotation is carried out. Therefore, in the embodiment illustrated in FIG. 8 and FIG. 9, when LLM added to FAS1 of the OTU frame 1 is "0", LLM added to FAS1 of the OTU frame 3 becomes "1". In this case, the transmission apparatus at the receiver end can identify the logical lane #01 from "LLM=0" and the logical lane #02 from "LLM=1".

However, since the rotation is not carried out to the OTU frames 2, 4, 6, . . . , the value of LLM added to FAS2 is the same as the value of LLM of FAS1 immediately before FAS2. For example, both LLM added to FAS1 of the OTU frame 1 and LLM added to FAS2 of the OTU frame 2 are "0". For that reason, in a configuration in which a logical lane is identified by using LLM added to FAS1, it is not possible to identify the logical lane by using LLM added to FAS2. Therefore, FAS2 is not used to identify each logical lane.

In this manner, when an OTU frame is transmitted at 400 Gbps by using 40 logical lanes #01 to #40, frame synchronization is established and the logical lanes are identified by using only FAS1. Here, FAS1 is inserted every 2040 cycles in each logical lane as in FIG. 8 to FIG. 9. Therefore, when FAS1 is detected every 2040 cycles in each logical lane, the transmission apparatus at the receiver end decides that synchronization is established in each logical lane. On the other hand, when an OTU frame is transmitted at 100 Gbps by using 20 logical lanes #01 to #20, the transmission apparatus at the receiver end can detect synchronization every 1020 cycles in each logical lane, as described with reference to FIG. 5 and FIG. 6. In other words, when the number of logical lanes increases with the increase in the transmission rate, the time needed to establish synchronization may become longer in the transmission apparatus at the receiver end.

Considering this, the transmission apparatus of the embodiments of the present invention has functions and configurations that do not allow the frame processing time (e.g. the time needed to establish synchronization) to become longer even when the number of logical lanes for transmitting a frame increases.

Figure 10:
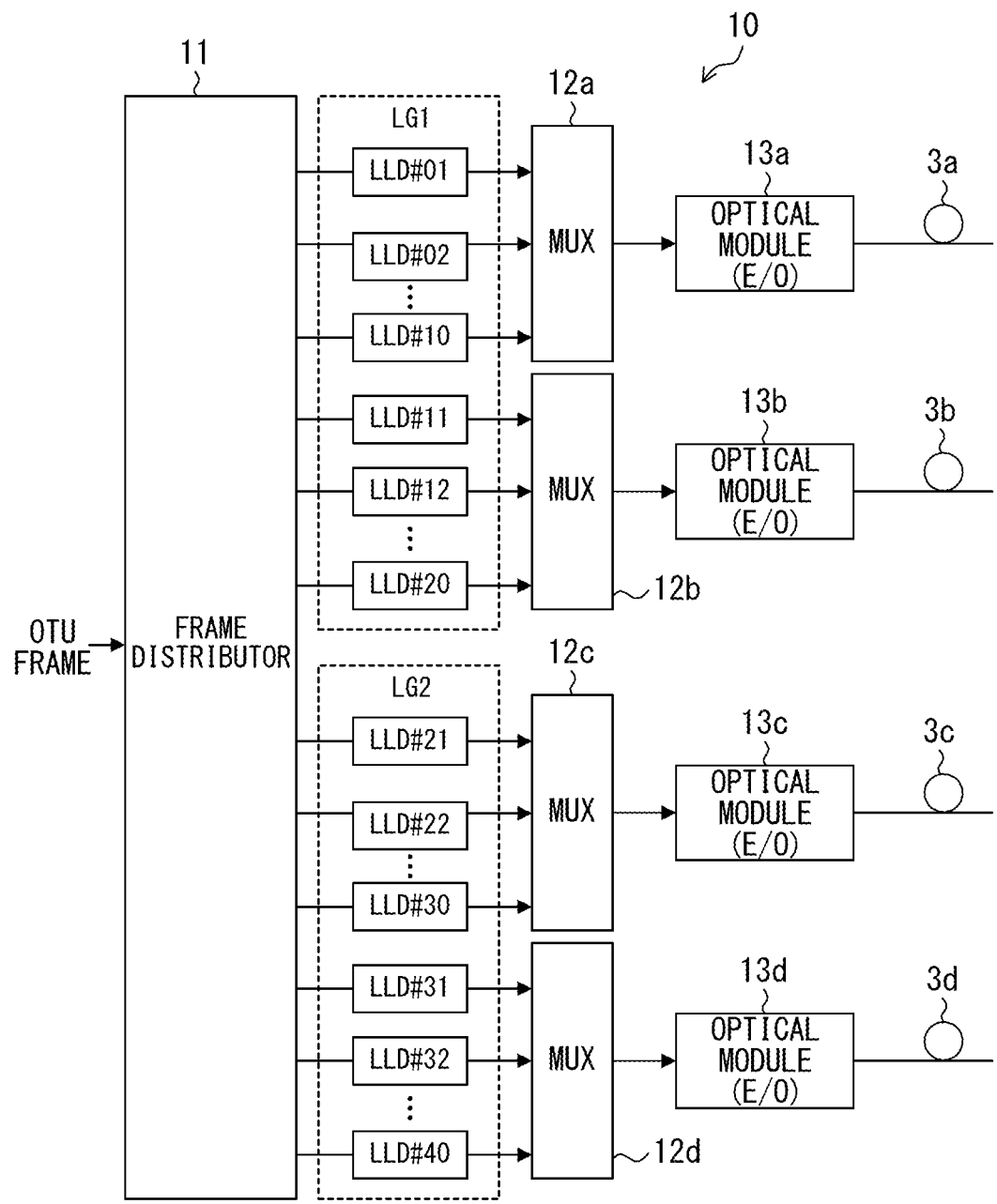
FIG. 10 illustrates a configuration of the transmission apparatus at the transmitter end.

FIG. 10 illustrates a configuration of the transmission apparatus at the transmitter end. This transmission apparatus 10 corresponds to the transmission apparatus 1A in FIG. 1.

In the embodiment illustrated in FIG. 10, an OTU frame at 400 Gbps is input to the transmission apparatus 10. The payload of this OTU frame stores client data. It should be noted that the transmission apparatus 10 may have a framer, which is not illustrated, to generate an OTU frame to store the client data. The transmission apparatus 10 may also provide 40 logical lanes #01 to #40. The transmission rate of each logical lane is approximately 10 Gbps.

The transmission apparatus 10 has a frame distributor 11, multiplexers (MUX) 12a to 12d, and optical modules (E/O) 13a to 13d. An input OTU frame is guided to the frame distributor 11.

The frame distributor 11 adds group identification information and lane identification information to the input OTU frame. The group identification information identifies plural logical lane groups obtained by grouping the logical lanes #01 to #40. In the example in FIG. 10, the logical lanes #01 to #40 are grouped into two logical lane groups (LG1, LG2). Therefore, group identification information to identify "LG1" or "LG2" is added to the OTU frame. The lane identification information identifies a logical lane in a logical lane group.

Figure 11:
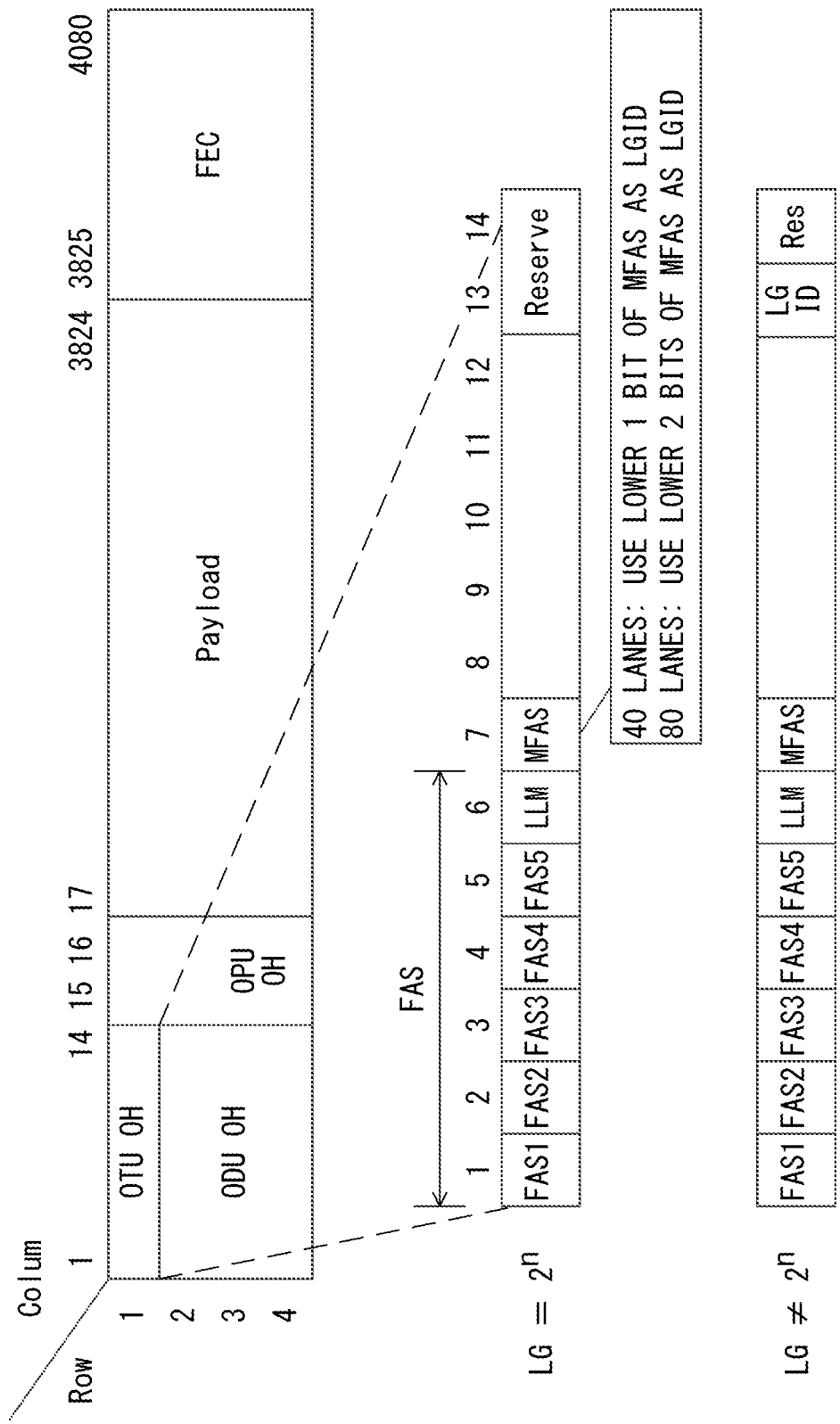
FIG. 11 is a diagram explaining the allocation of the group identification information and the lane identification information.

FIG. 11 is a diagram explaining the allocation of the group identification information and the lane identification information. The group identification information and the lane identification information are inserted into the OTU overhead. The OTU overhead is placed in the 1st to the 14th bytes in the first row of the OTU frame.

1st to 6th bytes of the OTU overhead stores FAS (Frame Alignment Signal). FAS is used to establish frame synchronization in the transmission apparatus at the receiver end. In other words, FAS is an example of synchronization information. 7th byte of the OTU overhead stores MFAS (Multi Frame Alignment Signal). MFAS is incremented at each OTU frame. 13th to 14th bytes of the OTU overhead are a reserve section.

In the following descriptions, the group identification information is referred to as a lane group ID (LGID). A logical lane group identified by the lane group ID is referred to as a lane group. Furthermore, the lane identification information is represented by LLM (Logical Lane Marker).

It should be noted that lane groups are counted in order from "1". Meanwhile, lane group IDs are generated in order from "0". Therefore, the lane groups LG1 and LG2 are identified by "LGID=0" and "LGID=1", respectively.

When the number of lane groups is $2^n$, the lane group ID is realized by using a portion of the bits in MFAS. For example, when the number of lane groups is two, each group is identified by using the lower 1 bit of MFAS. In this case, "0" or "1" is given to each frame alternately as the value of the lane group ID. When the number of lane groups is four, each group is identified by using the lower 2 bits of MFAS. In this case, any of "0" to "3" is given to each frame in order as the value of the lane group ID.

When the number of lane groups is not $2^n$, the lane group ID is inserted into the reserve section. As an example, the lane group ID is inserted into 13th byte of an OTU overhead. It should be noted that when the number of lane groups is L, any of "0" to "L−1" is given to each frame in order as the value of the lane group ID.

LLM for identifying a logical lane is inserted into 6th byte of the OTU overhead regardless of the number of lane groups. LLM is incremented every time the above-described rotation is carried out. Here, when the number of logical lanes in each lane group is N, the values of LLM are "0" to "N−1" in order, for example. However, the range of the values that LLM can take is not limited to "0" to "N−1". For example, the values of LLM may be provided by a counter that has a cycle of the integral multiple of N. As an example, when the number of logical lanes in each lane group is 20, the value of LLM is provided by a counter that cyclically counts from "0" to "239".

The frame distributor 11 divides a frame to which group identification information (i.e., a lane group ID) and lane identification information (i.e., LLM) are added into plural frame elements and distributes them to the logical lanes #01 to #40. At that time, an OTU frame is divided into 16-byte frame elements as illustrated in FIG. 4.

Here, the lane group ID identifies the lane group LG1 or LG2 illustrated in FIG. 10. The logical lane to which the first frame element of the OTU frame is to be inserted (hereinafter referred to as a logical lane x) is specified by performing the following calculation on LLM.

$$x = \text{LLM}(\bmod\ 20) + 1$$

In other words, the logical lane x can be specified by adding 1 to the reminder of LLM divided by 20. For example, when LLM=10, x=11 is obtained. This value x identifies a logical lane in a lane group. Therefore, when "lane group ID=0" and "LLM=10", for example, the 11th logical lane of the lane group LG1 (i.e., the logical lane #11) is identified. When "lane group ID=1" and "LLM=10", the 11th logical lane of the lane group LG2 (i.e., the logical lane #31) is identified.

The frame distributor 11 guides the first frame element of the OTU frame to the logical lane specified in the above manner. The frame distributor 11 sequentially distributes the other frame elements of the OTU frame to the logical lanes #01 to #40.

FIG. 12 to FIG. 13 are diagrams illustrating an example of distribution by the frame distributor 11. Here, the frame distributor adds "lane group ID=0" and "LLM=0" to the OTU frame 1, "lane group ID=1" and "LLM=0" to the OTU frame 2, "lane group ID=0" and "LLM=1" to the OTU frame 3, and "lane group ID=1" and "LLM=1" to the OTU frame 4.

The frame distributor 11 allocates the first frame element of the OTU frame 1 (i.e., the frame element "1:16") to the logical lane #01 in the lane group LG1. The frame distributor 11 sequentially distributes the remaining frame elements of the OTU frame 1 to the logical lanes #01 to #40 from the logical lane #02. As a result, the last frame element of the OTU frame 1 (i.e., the frame element "16305:16320") is allocated to the logical lane #20.

Next, the frame distributor 11 allocates the first frame element "1:16" of the OTU frame 2 to the logical lane #21 in the lane group LG2. The frame distributor 11 sequentially distributes the remaining frame elements of the OTU frame 2 to the logical lanes #01 to #40 from the logical lane #22. As a result, the last frame element "16305:16320" of the OTU frame 2 is allocated to the logical lane #40.

As described above, in this example, when two OTU frames are sequentially distributed to the logical lanes #01 to #40, all the logical lanes have frame elements respectively distributed in the last cycle (i.e., the 51st cycle). Therefore, the rotation is carried out every two OTU frames. It should be noted that the rotation is performed by incrementing LLM to be added to the next OTU frame. In this embodiment, "LLM=1" is added to the OTU frame 3.

The frame distributor 11 allocates the first frame element "1:16" of the OTU frame 3 to the logical lane #2 in the lane group LG1. The frame distributor 11 sequentially distributes the remaining frame elements of the OTU frame 3 to the logical lanes #01 to #40 from the logical lane #3. As a result, the last frame element "16305:16320" of the OTU frame 3 is allocated to the logical lane #21.

Next, the frame distributor 11 allocates the first frame element "1:16" of the OTU frame 4 to the logical lane #22 in the lane group LG2. The frame distributor 11 sequentially distributes the remaining frame elements of the OTU frame 4 to the logical lanes #01 to #40 from the logical lane #23. As a result, the last frame element "16305:16320" of the OTU frame 4 is allocated to the logical lane #01.

The rotation is carried out every two OTU frames in the same manner afterward. In other words, "lane group ID=0" and "LLM=19" are added to the OTU frame 39, and "lane group ID=1" and "LLM=19" are added to the OTU frame 40.

Consequently, the frame distributor 11 allocates the first frame element "1:16" of the OTU frame 39 to the logical lane #20 in the lane group LG1. The frame distributor 11 sequentially distributes the remaining frame elements of the OTU frame 39 to the logical lanes #01 to #40 from the logical lane #21. As a result, the last frame element "16305:16320" of the OTU frame 39 is allocated to the logical lane #39.

Moreover, the frame distributor 11 allocates the first frame element "1:16" of the OTU frame 40 to the logical lane #40 in the lane group LG2. The frame distributor 11 sequentially distributes the remaining frame elements of the OTU frame 40 to the logical lanes #01 to #40 from the logical lane #01. As a result, the last frame element "16305:16320" of the OTU frame 40 is allocated to the logical lane #19.

Here, the synchronization information of each OTU frame (i.e., FAS) is stored in the OTU overhead. Thus, FAS of each OTU frame is stored in the frame element "1:16". It should be noted that the frame element "1:16" also stores the lane group ID and LLM.

In this manner, the rotation is carried out every two OTU frames (i.e., every 51 cycles) in the transmission apparatus 10. In the lane group LG1 that includes the logical lanes #01 to #20, the logical lane to which FAS is allocated is shifted every 51 cycles. For example, FAS is allocated to the logical lane #01 in the 1st cycle, and FAS is allocated in the logical lane #02 in the 52nd cycle. FAS is allocated in the logical lane #01 again in the 1021st cycle. It should be noted that in FIG. 12 and FIG. 13, FAS allocated to the lane group LG1 is written as "FAS1".

In a similar manner, in the lane group LG2 that includes the logical lanes #21 to #40, the logical lane to which FAS is allocated is shifted every 51 cycles. For example, FAS is allocated in the logical lane #21 in the 26th cycle and FAS is allocated in the logical lane #22 in the 77th cycle. FAS is allocated in the logical lane #21 again in the 1046th cycle. It should be noted that in FIG. 12 and FIG. 13, FAS allocated to the lane group LG2 is written as "FAS2".

Return to FIG. 10. The multiplexers 12a to 12d respectively multiplex the signals in the corresponding logical lanes. Multiplexing of the logical lanes is normally carried out within the same lane group. In the example in FIG. 10, the multiplexer 12a multiplexes the signals in the logical lanes #01 to #10, the multiplexer 12b multiplexes the signals in the logical lanes #11 to #20, the multiplexer 12c multiplexes the signals in the logical lanes #21 to #30, and the multiplexer 12d multiplexes the signals in the logical lanes #31 to #40. In other words, 10:1 multiplexing is performed by each of multiplexers 12a and 12b in LG1, and 10:1 multiplexing is performed by each of multiplexers 12c and 12d in LG2. However, the transmission apparatus of the present invention is not limited to the configuration illustrated in FIG. 10, but logical lanes that belong to different lane groups may be multiplexed together.

The optical modules 13a to 13d respectively convert output signals from the multiplexers 12a to 12d into optical signals. Each of the optical modules 13a to 13d includes an E/O device having a bandwidth of approximately 100 Gbps. The optical signals generated by the optical modules 13a to 13d are transmitted to the transmission apparatus at the receiver end (the transmission apparatus 1B in FIG. 1) via optical transmission paths 3a to 3d, respectively.

FIG. 14 illustrates a configuration of the frame distributor 11. As illustrated in FIG. 14, the frame distributor 11 includes an identification information adding unit 21, a frame divider 22, a selector 23, and buffers #1 to #M. M denotes the total number of the logical lanes. M=40 is given in the example illustrated in FIG. 10. N denotes the number of logical lanes in each lane group. N=20 is given in the example illustrated in FIG. 10. L denotes the number of lane groups. L=2 is given in the example illustrated in FIG. 10.

The identification information adding unit 21 adds LLM to each input OTU frame. When the number of lane groups is not $2^n$, the identification information adding unit 21 further adds a lane group ID to each input OTU frame. In the following descriptions, the processing in the identification information adding unit 21 is explained with reference to the flowchart in FIG. 15. It should be noted that in this example, the lower 1 bit of MFAS is used as the lane group ID.

In S1, the identification information adding unit 21 detects a new OTU frame. At that time, the identification information adding unit 21 detects the new OTU frame by detecting FAS from an input bit sequence, for example. It should be noted that the bit pattern of FAS is specified in advance.

In S2, the identification information adding unit 21 detects MFAS. MFAS is incremented by a circuit that forms OTU frames, although this circuit is not illustrated. In one embodiment, when MFAS is used as a lane group ID, bits in MFAS are set to be "all zero" as an initial condition.

Here, when the number of lane groups is $2^n$, a portion of MFAS is used as a lane group ID, as explained with reference to FIG. 11. Since the number of lane groups is two in this embodiment, the lower 1 bit of MFAS is used as a lane group ID. When the number of lane groups is not $2^n$, the identification information adding unit 21 increments the lane group ID.

It should be noted that MFAS is represented by 8 bits. Therefore, MFAS returns to zero every 256 OTU frames. However, the lower 1 bit of MFAS repeats "0" and "1" alternately for each frame. In other words, the lower 1 bit of MFAS returns to zero every two OTU frames. However, when the number of lane groups is L (except for $2^n$), "0" to "L-1" are sequentially given to the value of the lane group ID for each frame, as described above.

In S3, the identification information adding unit 21 decides whether or not the lane group ID is zero. In this example, the lower 1 bit of MFAS is used as a lane group ID. Therefore, the identification information adding unit 21 decides whether or not the lower 1 bit of MFAS is zero.

When the lane group ID (i.e., the lower 1 bit of MFAS) is zero, the identification information adding unit 21 increments LLM in S4. On the other hand, when the lane group ID is not zero, the processing in S4 is skipped. In this case, the value of LLM is not changed.

When the number of lane groups is $2^n$, in S5, the identification information adding unit 21 adds LLM obtained in S2-S4 to the input OTU frame. At that time, the identification information adding unit 21 writes LLM obtained in S2-S4 in the 6th byte of the OTU overhead.

When the number of lane groups is not $2^n$, in S5, the identification information adding unit 21 adds the LGID and LLM obtained in S2-S4 to the input OTU frame. At that time, the identification information adding unit 21 writes LLM obtained in S2-S4 in the 6th byte of the OTU overhead and also writes the LGID in the 13th byte of the OTU overhead.

The identification information adding unit 21 performs S1-S5 every time an OTU frame is received. As a result, a lane group ID and LLM are added to each input OTU frame.

An example is given. The example here assumes that when "MFAS=0" is given as the initial condition, "LLM=0" is given and the rotation is started. In this case, for example, the following sets of identification information are added to the input OTU frames 1 through 10 in order. The LGID indicates the lane group ID.
OTU frame 1: LGID=0, LLM=0
OTU frame 2: LGID=1, LLM=0
OTU frame 3: LGID=0, LLM=1
OTU frame 4: LGID=1, LLM=1
OTU frame 5: LGID=0, LLM=2
OTU frame 6: LGID=1, LLM=2
OTU frame 7: LGID=0, LLM=3
OTU frame 8: LGID=1, LLM=3
OTU frame 9: LGID=0, LLM=4
OTU frame 10: LGID=1, LLM=4

It should be noted that when the number of lane groups is 4, the lower two bits of MFAS are used as a lane group ID. In this case, the following sets of identification information are added to the input OTU frames 1 through 10 in order.
OTU frame 1: LGID=0, LLM=0
OTU frame 2: LGID=1, LLM=0
OTU frame 3: LGID=2, LLM=0
OTU frame 4: LGID=3, LLM=0
OTU frame 5: LGID=0, LLM=1
OTU frame 6: LGID=1, LLM=1
OTU frame 7: LGID=2, LLM=1
OTU frame 8: LGID=3, LLM=1
OTU frame 9: LGID=0, LLM=2
OTU frame 10: LGID=1, LLM=2

When the number of lane groups is not $2^n$, in S2 in FIG. 15, the lane group ID is incremented. In S3, whether or not the lane group ID is zero is decided. As an example, when the number of lane groups is 3, the following sets of identification information are added to the input OTU frames 1 through 10 in order.
OTU frame 1: LGID=0, LLM=0
OTU frame 2: LGID=1, LLM=0
OTU frame 3: LGID=2, LLM=0
OTU frame 4: LGID=0, LLM=1
OTU frame 5: LGID=1, LLM=1
OTU frame 6: LGID=2, LLM=1
OTU frame 7: LGID=0, LLM=2
OTU frame 8: LGID=1, LLM=2
OTU frame 9: LGID=2, LLM=2
OTU frame 10: LGID=0, LLM=3

In this manner, the identification information adding unit 21 adds LLM to each input OTU frame. At that time, when the number of lane groups is not $2^n$, the identification information adding unit 21 further adds a lane group ID to each input OTU frame. It should be noted that when the number of lane groups is $2^n$, the lane group ID may be indicated by MFAS. The OTU frame to which LLM (and a lane group ID) is added by the identification information adding unit 21 is guided to the frame divider 22.

Return to FIG. 14. The frame divider 22 divides a frame into plural frame elements. An OTU frame is divided into 16-byte frame elements as illustrated in FIG. 4. Here, the synchronization information FAS, the lane group ID, and LLM are stored in the first frame element of the plural frame elements obtained by dividing the OTU frame.

The selector 23 sequentially distributes the frame elements output from the frame divider 22 to the buffers #1 to #M based on the lane group ID and LLM. Here, each of the buffers #1 to #M corresponds to one logical lane. For example, when M=40 is given, the buffers #1 to #40 correspond to the logical lanes #01 to #40, respectively. Consequently, the frame distributor 11 can realize the processing to distribute frame elements to plural logical lanes by distributing the frame elements to the buffers #1 to #M.

In this manner, each of the buffers #1 to #40 corresponds to one logical lane. Therefore the processing for distributing the frame elements to the buffers #1 to #M is substantially equivalent to the processing for distributing the frame elements to plural logical lanes. Since the processing for distributing the frame elements to plural logical lanes has been explained with reference to FIG. 10 to FIG. 13, the explanation is omitted. The frame elements stored in the buffers #1 to #M are readout by a read circuitry that is not illustrated and are guided to the multiplexers 12a to 12d.

In this manner, the transmission apparatus 10 adds a lane group ID and LLM to each input OTU frame. The transmission apparatus 10 divides an OTU frame into frame segments and distributes them to plural logical lanes #01 to #40. The transmission apparatus 10 outputs the signals in the logical lanes #01 to #40 to the optical transmission paths 3a to 3d.

Figure 16:
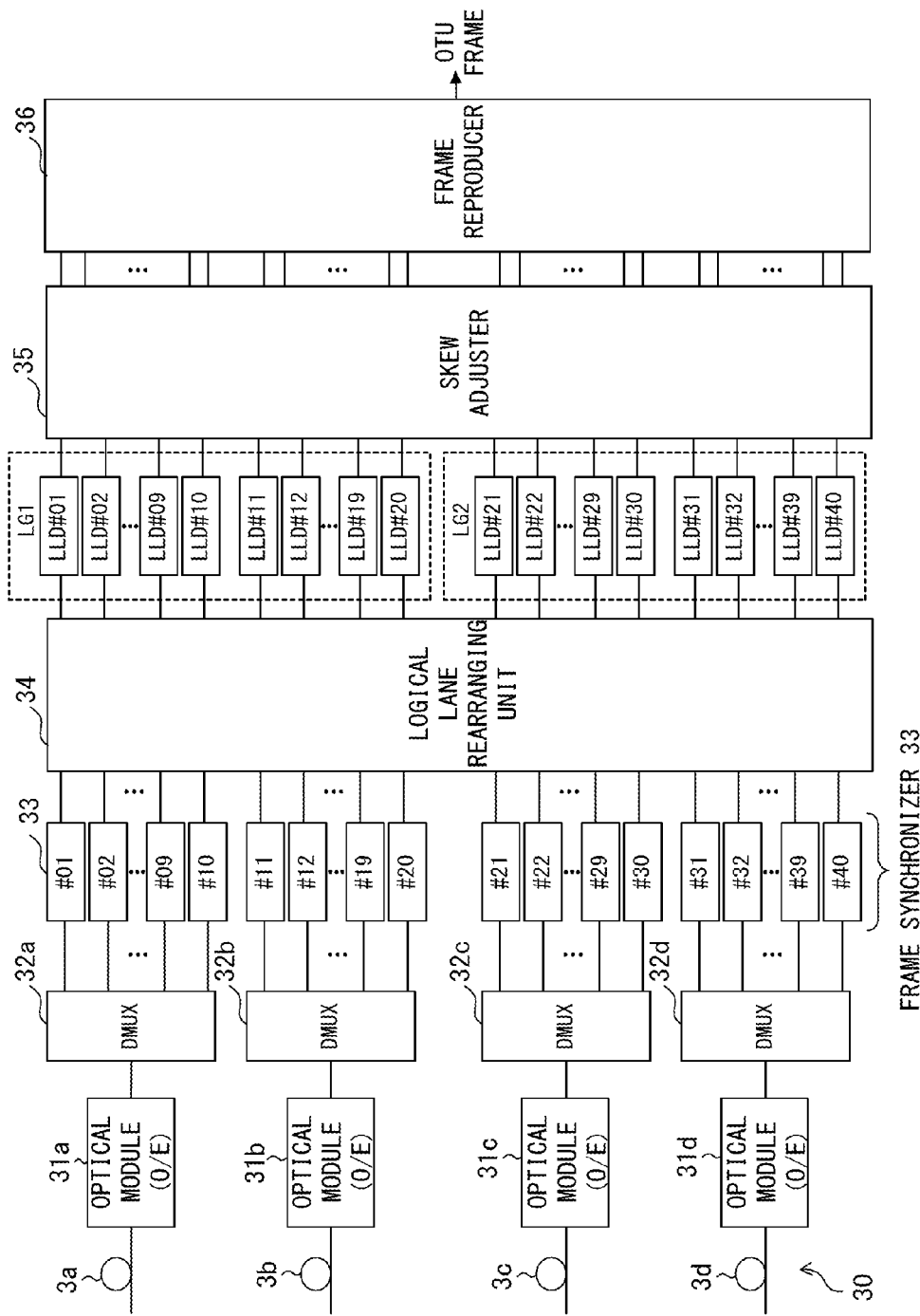
FIG. 16 illustrates a configuration of the transmission apparatus at the receiver end.

FIG. 16 illustrates a configuration of the transmission apparatus at the receiver end. This transmission apparatus 30 corresponds to the transmission apparatus 1B in FIG. 1. The transmission apparatus 30 receives the optical signals transmitted from the transmission apparatus 10 illustrated in FIG. 10 via the optical transmission paths 3a to 3d.

The transmission apparatus 30 includes optical modules (O/E) 31a to 31d, demultiplexers (DMUX) 32a to 32d, a frame synchronizer 33, a logical lane rearranging unit 34, a skew adjuster 35, and a frame reproducer 36. The optical modules 31a to 31d respectively convert optical signals received via the transmission paths 3a to 3d into electrical signals. Each of the optical modules 31a to 31d includes an O/E device that has a bandwidth of 100 Gbps. The demultiplexers 32a to 32d respectively demultiplex the outputs from the optical modules 31a to 31d. Here, each of the demultiplexers 32a to 32d performs the inverse processing of the multiplexers 12a to 12d provided in the transmission apparatus 10 at the transmitter end. Therefore, in this example, each of the demultiplexers 32a to 32d outputs ten bit-sequence signals by demultiplexing the input signals.

To the frame synchronizer 33, the ten bit-sequence signals are input from each of the demultiplexers 32a to 32d. Therefore, the frame synchronizer 33 receives the input of the signals of the logical lanes #01 to #40 illustrated in FIG. 12 and FIG. 13.

The frame synchronizer 33 establishes synchronization by detecting FAS in each logical lane. Here, in the transmission apparatus 10 at the transmitter end illustrated in FIG. 10, FAS is inserted into each logical lane by the rotation. More specifically, FAS is inserted at 1020-cycle intervals in each logical lane as illustrated in FIG. 17.

Given that, FAS is for example inserted into the logical lane #01 in the 1st cycle. In this case, FAS is inserted into the logical lane #21 in the 26th cycle, FAS is inserted into the logical lane #02 in the 52th cycle, and FAS is inserted into the logical lane #22 in the 77th cycle. Then FAS is inserted into the logical lane #01 in the 1021st cycle, FAS is inserted into the logical lane #21 in the 1046th cycle, FAS is inserted into the logical lane #02 in the 1072nd cycle, and FAS is inserted into the logical lane #22 in the 1097th cycle.

As described above, the signal in each logical lane generated by the transmission apparatus 10 has FAS at 1020-cycle intervals. Therefore, the frame synchronizer 33 monitors the FAS pattern in each of 40 bit-sequence signals. The frame synchronizer 33 decides that the frame synchronization is established when it detects FAS at 1020-cycle intervals in all the bit-sequence signals.

The bit pattern of FAS is "F6 F6 F6 28 28 28", for example. However, the transmission apparatuses 10 and 30 may use the 6th byte in the FAS section as LLM. Therefore, the frame synchronizer 33 may detect synchronization by using the 1st to the 5th bytes of the FAS section.

The transmission apparatus 30 can establish synchronization of all logical lanes in the above manner. However, in order to reproduce an OTU frame in the transmission apparatus 30, the logical lanes #01 to #40 need to be arranged in the correct order.

When a system to transmit signals from the transmission apparatus 10 to the transmission apparatus 30 is configured, optical modules 13a and 31a, optical modules 13b and 31b, optical modules 13c and 31c, and optical modules 13d and 31d are usually connected with each other. In other words, the system is configured so that the lane groups are arranged in the same order at both the transmitter end and the receiver end. However, demultiplexers 32a to 32d merely demultiplex the received signals but do not arrange the logical lanes in order of the lane numbers. For that reason, the logical lanes arranged at the receiver end may not be in the same order as those at the transmitter end. In such a case, the transmission apparatus 30 at the receiver end cannot reproduce the OTU frame from the received signals.

Moreover, optical modules may not be correctly connected as described above between the transmitter end and the receiver end. In such a case, the lane groups at the receiver end are not arranged in the same order as those at the transmitter end, and the transmission apparatus 30 at the receiver end cannot reproduce the OTU frame from the received signals.

In order to solve this problem, the logical lane rearranging unit 34 rearranges logical lanes so that the order of the logical lanes at the receiver end becomes the same as the order at the transmitter end by using the lane group ID and LLM, which are inserted into each logical lane in the transmission apparatus 10 at the transmitter end. It should be noted that the lane group ID and LLM are stored in the same frame element as the frame element that stores FAS, as explained with reference to FIG. 11.

Figure 18:
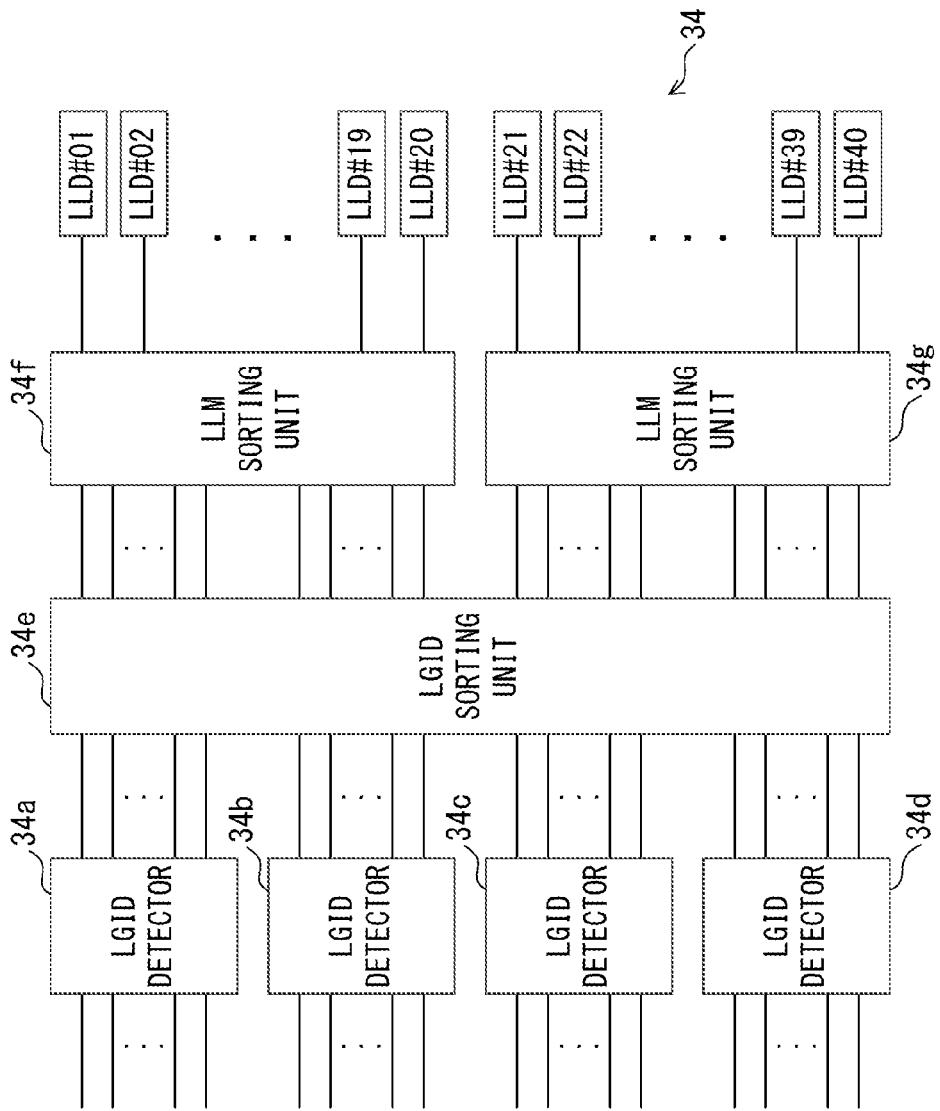
FIG. 18 illustrates a configuration of the logical lane rearranging unit.

FIG. 18 illustrates a configuration of the logical lane rearranging unit 34. The logical lane rearranging unit 34 includes LGID detectors 34a to 34d, an LGID sorting unit 34e, and LLM sorting units 34f and 34g. The LGID detector 34a detects lane group IDs from each of the ten received signals obtained by the demultiplexer 32a. In a similar manner, the LGID detectors 34b to 34d respectively detect lane group IDs from output signals of the demultiplexers 32b to 32d. The sorting unit 34e sorts 40 received signals based on the lane group IDs detected by the LGID detectors 34a to 34d. The LGID sorting unit 34e guides the signals to which "LGID=0" is added to the LLM sorting unit 34f, and also guides the signals to which "LGID=1" is added to the LLM sorting unit 34g. Based on LLM added to each of the received signals, the LLM sorting unit 34f sorts the signals to which "LGID=0" is added. In a similar manner, based on LLM added to each of the received signals, the LLM sorting unit 34g sorts the signals to which "LGID=1" is added.

Figure 19:
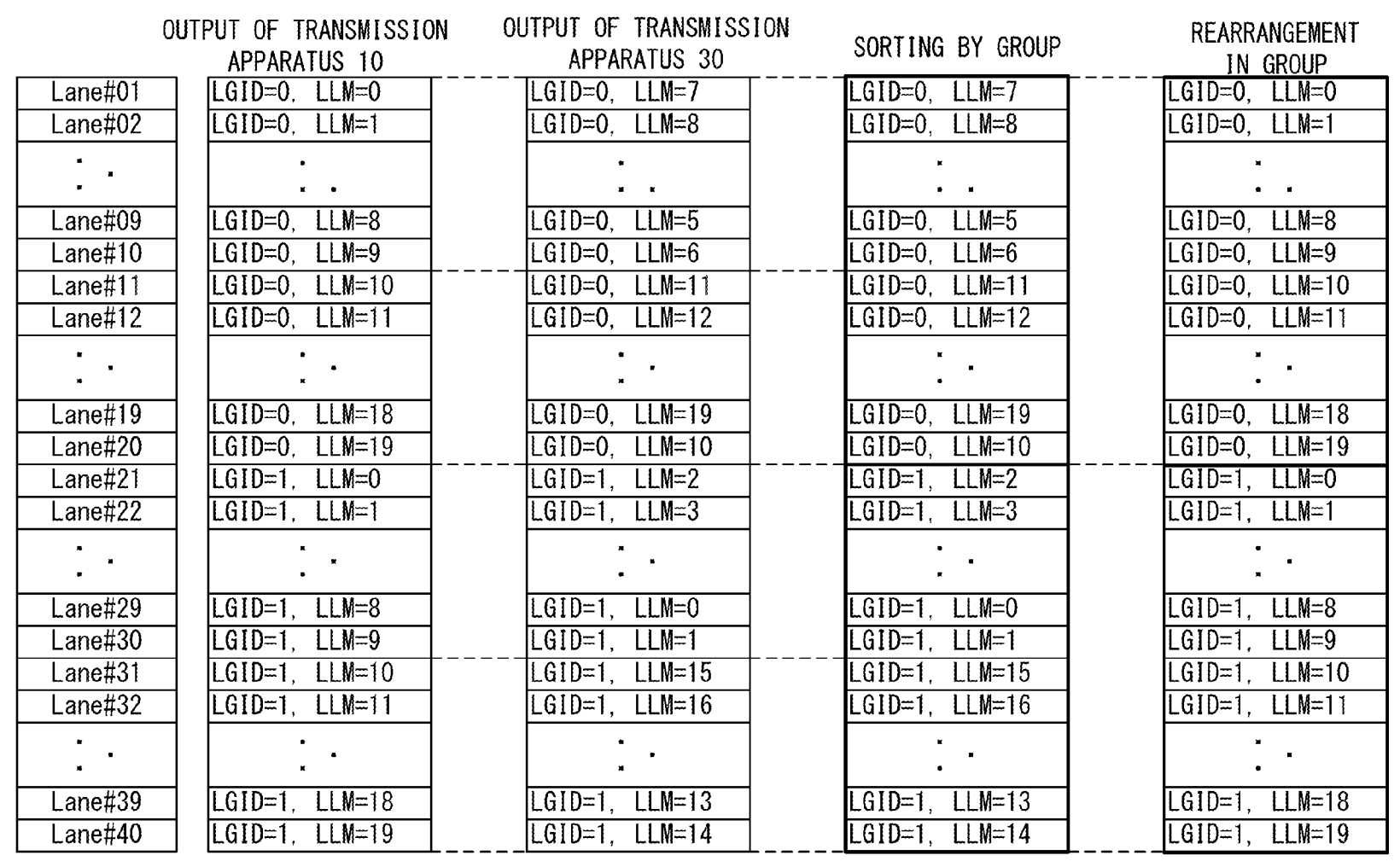

FIG. 19 is a diagram explaining operations of the logical lane rearranging unit 34. Here, assume that in the 40 logical lanes, ten logical lanes are multiplexed together. In other words, there are four optical transmission paths provided between the transmission apparatuses 10 and 30. At the transmission apparatus 30 at the receiver end, each of the signals transmitted via a corresponding optical transmission path is separated into ten demultiplexed signals and is guided to the logical lane rearranging unit 34. Therefore, the logical lane rearranging unit 34 has 40 input ports and 40 output ports.

The transmission apparatus 10 at the transmitter end adds LLM to each OTU frame as described above. Moreover, when the number of lane groups is $2^n$, for example, the LGID is indicated by a portion of MFAS inserted into each OTU frame. This OTU frame is divided into frame elements and the frame elements are distributed to the logical lanes #01 to #40. At that time, since the rotation is carried out at a specified intervals, the LGID and LLM are inserted into each of the logical lanes #01 to #40 as illustrated in FIG. 19.

It should be noted that in FIG. 19, an LGID identifies a lane group. In this embodiment, an LGID is "0" or "1". LLM(mod 20) indicates the reminder obtained by dividing the value of LLM by 20. For example, when LLM=7 is given, LLM(mod 20)=7 is obtained. In this embodiment, LLM(mod 20) can be any value within a range of 0 to 19. However, in FIG. 19, "LLM(mod 20)" is written as "LLM" to simplify the notation in the drawing.

Each of the logical lanes #01 to #40 is identified by a combination of the LGID and LLM(mod 20). In other words, when LGID=0 is given, LLM(mod 20)=0 to 19 each identify respective logical lanes #01 to #20. When LGID=1 is given, LLM(mod 20)=0 to 19 each identify respective logical lanes #21 to #40.

In the example provided in FIG. 19, the order of the logical lanes is different from that of the transmitter end as a result of the DEMUX operation by the demultiplexers. As a result, the lane groups are arranged in order with respect to LG1 and LG2 in the logical lane rearranging unit 34, but the logical lanes in each lane group are not arranged in numerical order.

The logical lane rearranging unit 34 detects an LGID and LLM (mod 20) from the signal guided to each input port. For example, the logical lane rearranging unit 34 detects "LGID=0" and "LLM(mod 20)=7" from a signal in the 1st input port and detects "LGID=1" and "LLM (mod 20)=14" from a signal in the 40th input port. It should be noted that the logical lane rearranging unit 34 may calculate LLM(mod 20) from the LLM value instead of receiving LLM(mod 20).

Moreover, depending on the connections between the transmission apparatus 10 and the transmission apparatus 30, lane groups may sometimes be shuffled. For that reason, the logical lane rearranging unit 34 sorts the signals in the input ports based on the LGIDs. In this example, the logical lane rearranging unit 34 collects signals to which "LGID=0" is added, and also collects signals to which "LGID=1" is added.

Next, the logical lane rearranging unit 34 rearranges the input signals within each of the groups identified by the LGID in accordance with the LLM(mod 20). In this example, input signals to which "LLM(mod 20)=0" to "LLM(mod 20)=19" are added are arranged in this order in the group identified by "LGID=0". As a result, in the group identified by "LGID=0", the input signals to which "LLM (mod 20)=0" to "LLM(mod 20)=19" are added are respectively guided to 1st to 20th output ports. In a similar manner, in the group identified by "LGID=1", the input signals to which "LLM(mod 20)=0" to "LLM(mod 20)=19" are added are respectively guided to 21st to 40th output ports. As a result, the order of the logical lanes #01 to #40 becomes the same between the transmission apparatus 10 at the transmitter end and the transmission apparatus 30 at the receiver end.

It should be noted that in the example illustrated in FIG. 19, the sorting operation using the LLM(mod 20) is performed in each group after the sorting operation using the LGID in the group, but the present invention is not limited to these steps. For example, the sorting operation using the LGID may be performed in each group after the sorting operation using the LLM(mod 20) in the group. Alternatively, the rearrangement of all the logical lanes can be realized by a single process that uses the LGID and LLM (mod 20).

The logical lane rearranging unit 34 may be implemented by using a switch circuitry that includes plural input ports and plural output ports, for example. In this case, paths between the plural input ports and the plural output ports are determined based on the LGID and LLM detected from each input port.

In this manner, since the transmission apparatus 30 includes the logical lane rearranging unit 34, no matter what the connections of the optical transmission paths between the transmission apparatuses 10 and 30 are, the order of the logical lanes #01 to #40 is the same between the transmission apparatus 10 and the transmission apparatus 30. For that reason, the task to configure a transmission system becomes simpler. In other words, reliability of the transmission system is improved.

FIG. 20 illustrates a configuration of the skew adjuster 35. The skew adjuster 35 adjusts skew (timing error) between the logical lanes. It should be noted that the skew between the logical lanes is generated, for example, when the lengths of the optical transmission paths 3a to 3d are different from one another. The skew between the logical lanes may be generated by other factors.

The skew adjuster 35 includes inter-lane skew adjusters 35a and 35b, and an inter-group skew adjuster 35c as illustrated in FIG. 20A. The inter-lane skew adjusters 35a and 35b have the same configuration and the same functions.

The inter-lane skew adjuster 35a receives an input of signals transmitted through the logical lanes #01 to #20 (hereinafter referred to as logical lane signals #01 to #20). The logical lanes #01 to #20 belong to the lane group LG1. The inter-lane skew adjuster 35a adjusts the timings of the logical lane signals #02 to #20 with respect to the logical lane signal #01. Here, FASs of the logical lane signals #02 to #20 are respectively inserted at timings that are delayed sequentially from FAS in the logical lane signal #01 every 51 cycles in the transmission apparatus 10 at the transmitter end, as illustrated in FIG. 12. Therefore, the inter-lane skew adjuster 35a adjusts the timings of the logical lane signals #02 to #20 so that FASs of the logical lane signals #02 to #20 are allocated in order every 51 cycles with respect to FAS of the logical lane signal #01.

Here, each of the logical lane signals #01 to #20 is stored in the buffer in the inter-lane skew adjuster 35a. The inter-lane skew adjuster 35a adjusts the timing difference between the logical lane signals #01 to #20 by controlling the timing of reading corresponding logical lane signal from the buffer.

The logical lane signals #21 to #40 are input to the inter-lane skew adjuster 35b. The logical lane signals #21 to #40 belong to the lane group LG2. The operations of the inter-lane skew adjuster 35b are substantially the same as those of the inter-lane skew adjuster 35a. In other words, the inter-lane skew adjuster 35b adjusts the timings of the logical lane signals #22 to #40 so that FASs of the logical lane signals #22 to #40 are allocated in order every 51 cycles with respect to FAS of the logical lane signal #21. It is preferable that the inter-lane skew adjusters 35a and 35b operate in parallel.

The logical lane signals #01 to #40 that are adjusted the skew within each lane group by the inter-lane skew adjusters 35a and 35b are input to the inter-group skew adjuster 35c. The inter-group skew adjuster 35c extracts one logical lane signal from each of the lane groups LG1 and LG2. Here, the logical lane signal #01 is extracted from the lane group LG1 and the logical lane signal #21 is extracted from the lane group LG2.

Here, in the example illustrated in FIG. 12, FAS of the logical lane signal #01 is allocated in the 1st cycle, and FAS of the logical lane signal #21 is allocated in the 26th cycle. In other words, in the transmission apparatus 10 at the transmitter end, FAS of the logical lane signal #21 is inserted at the timing at which 25 cycles have passed from FAS of the logical lane signal #01. Therefore, the inter-group skew adjuster 35c adjusts the timing of the logical lane signal #21 so that FAS of the logical lane signal #21 is allocated at the timing at which 25 cycles have passed from FAS of the logical lane signal #01. At that time, the logical lane signals #01 to #40 are temporarily stored in the buffer in the inter-group skew adjuster 35c. The inter-group skew adjuster 35c adjusts the timing difference between the logical lane signals #01 to #40 by controlling the timing of reading each logical lane signal from the buffer.

The skew adjustment in each lane group is performed in advance by the inter-lane skew adjusters 35a and 35b. Therefore, the inter-group skew adjuster 35c performs timing adjustment among the logical lanes in each lane group based on the result of the timing adjustment between the logical lane signals #01 and #21. As a result, the skew of all the logical lane signals #01 to #40 is adjusted in the skew adjuster 35.

In this manner, according to the configuration of the embodiment, the skew in each lane group is adjusted, and then the skew between the lane groups is adjusted. However, the present invention is not limited to this configuration. In other words, as illustrated in FIG. 20B, the skew in each lane group may be adjusted after the skew between the lane groups is adjusted.

According to the embodiment, the configurations of the inter-lane skew adjusters 35a and 35b are the same. For that reason, when the transmission apparatuses 10 and 30 transmit an OTU frame by using 20 logical lanes #01 to #20 for example, the skew adjuster 35 can stop one of the inter-lane skew adjusters 35a and 35b. In this case, the inter-group skew adjuster 35c does not perform the skew adjustment.

As described above, the skew adjuster 35 is applicable to both the case in which 20 logical lanes are used and the case in which 40 logical lanes are used. Here, the configurations of the inter-lane skew adjusters 35a and 35b are the same. Therefore, according to the configuration of the embodiment, it is possible to configure the circuit flexibly to the changes in the transmission rate while the components are standardized.

The frame reproducer 36 reproduces the OTU frame from the output signals of the logical lanes #01 to #40 in which the skew has been adjusted by the skew adjuster 35. At that time, the frame reproducer 36 reproduces the OTU frame from the 40 logical lanes by performing inverse processing of the distribution processing in the frame distributor 11. Then the transmission apparatus 30 generates one or more client signals from the reproduced OTU frame and transmits the signals to the corresponding client.

As described above, the transmission apparatus of the embodiment groups plural logical lanes and performs signal processing for each group. For that reason, in the transmission apparatus of the embodiment, the processing time of a frame is shorter than the conventional arts that do not make logical lane groups.

For example, in the example explained with reference to FIG. 8 and FIG. 9, the period of time needed to allocate FASs used in the synchronization processing to all the logical lanes #01 to #40 is 1990 cycles. The period of insertion of FAS that is used in the synchronization processing in each logical lane is 2040 cycles.

Meanwhile, in the configuration of the embodiment, as illustrated in FIG. 12 and FIG. 13, the period of time needed to allocate FASs used in the synchronization processing to all the logical lanes #01 to #40 is 995 cycles. The period of insertion of FAS that is used in the synchronization processing in each logical lane is 1020 cycles. Here, in the configuration of the embodiment, the processing related to the control between the lane groups is necessary, but the period of time needed for this processing is approximately several cycles to several tens of cycles. Therefore, according to the configuration of the embodiment, the processing time of a frame (e.g., a time period needed to establish synchronization) is shorter than in the conventional configurations.

<Configuration Using 80 Logical Lanes>

When an OTU frame is transmitted by using 80 logical lanes, the logical lanes #01 to #80 are grouped into four lane groups. The configuration and the operations of the transmission apparatus at the transmitter end are substantially the same as those of the transmission apparatus 10 illustrated in FIG. 10. However, the frame distributor 11 distributes the OTU frame to the logical lanes #01 to #80. At that time, the frame distributor 11 operates with M=80, N=20, and L=4 in FIG. 14. The multiplexers and the optical modules are suitably designed in accordance with the number of logical lanes.

FIG. 21 to FIG. 23 illustrate an example of distribution by the frame distributor 11. In this example, the logical lanes #01 to #20 belong to the lane group LG1 (LGID=0), the logical lanes #61 to #80 belong to the lane group LG2 (LGID=1), the logical lanes #41 to #60 belong to the lane group LG3 (LGID=2), and the logical lanes #21 to #40 belong to the lane group LG4 (LGID=3). In addition, in the frame distributor 11, the lower 2 bits of MFAS are detected and used as an LGID. Furthermore, in the frame distributor 11, LLM is incremented by one for every rotation. It should be noted that the rotation is carried out every four OTU frames.

The first frame element (i.e., "1:16") of the OTU frame 1 is allocated to the logical lane #01 in the 1st cycle. In this case, the last frame element (i.e., "16305:16320") of the OTU frame 1 is allocated to the logical lane #60 in the 13th cycle. Therefore, the first frame element "1:16" of the OTU frame 2 is allocated to the logical lane #61 in the 13th cycle. Similarly, the first frame element of the OTU frame 3 is allocated to the logical lane #41 in the 26th cycle, and the first frame element of the OTU frame 4 is allocated to the logical lane #21 in the 39th cycle. Then the last frame element "16305:16320" of the OTU frame 4 is allocated to the logical lane #80 in the 51st cycle.

As described above, four OTU frames are distributed to the logical lanes #01 to #80 in the 1st to the 51st cycles. In the 51st cycle, frame elements are distributed to all the logical lanes #01 to #80. Therefore, at the time of shifting from the OTU frame 4 to the OTU frame 5 (i.e., at the time of shifting from the 51st cycle to the 52nd cycle), the rotation is carried out. In other words, the rotation is carried out every 51 cycles in this configuration.

In each of the lane groups LG1 to LG4, the logical lanes to which a frame element including FAS is inserted are shifted in order every time the rotation is carried out (i.e., every 51 cycles). For example, in the lane group LG1, after FAS is inserted into the logical lane #01 in the 1st cycle, FAS is inserted into the logical lane #02 in the 52nd cycle. At that time, the value of LLM is incremented by one for every rotation. Therefore, for example, when LLM added to FAS of the logical lane #01 in the 1st cycle is "0", LLM added to FAS of the logical lane #02 in the 52nd cycle is "1".

When the above distribution is executed to the consecutively-input OTU frames, the distribution of the OTU frame 80 is finished in the 1020th cycle. In the 1021st cycle, FAS is once again inserted into the logical lane #01. In this manner, FAS is inserted every 1020 cycles in each logical lane. Each FAS is provided with a lane group ID and LLM.

The configuration and the operations of the transmission apparatus at the receiver end that uses 80 logical lanes are substantially the same as those of the transmission apparatus 30 illustrated in FIG. 16. However, the optical modules and the demultiplexers correspond to the configuration of the transmission apparatus at the transmitter end.

Figure 24:
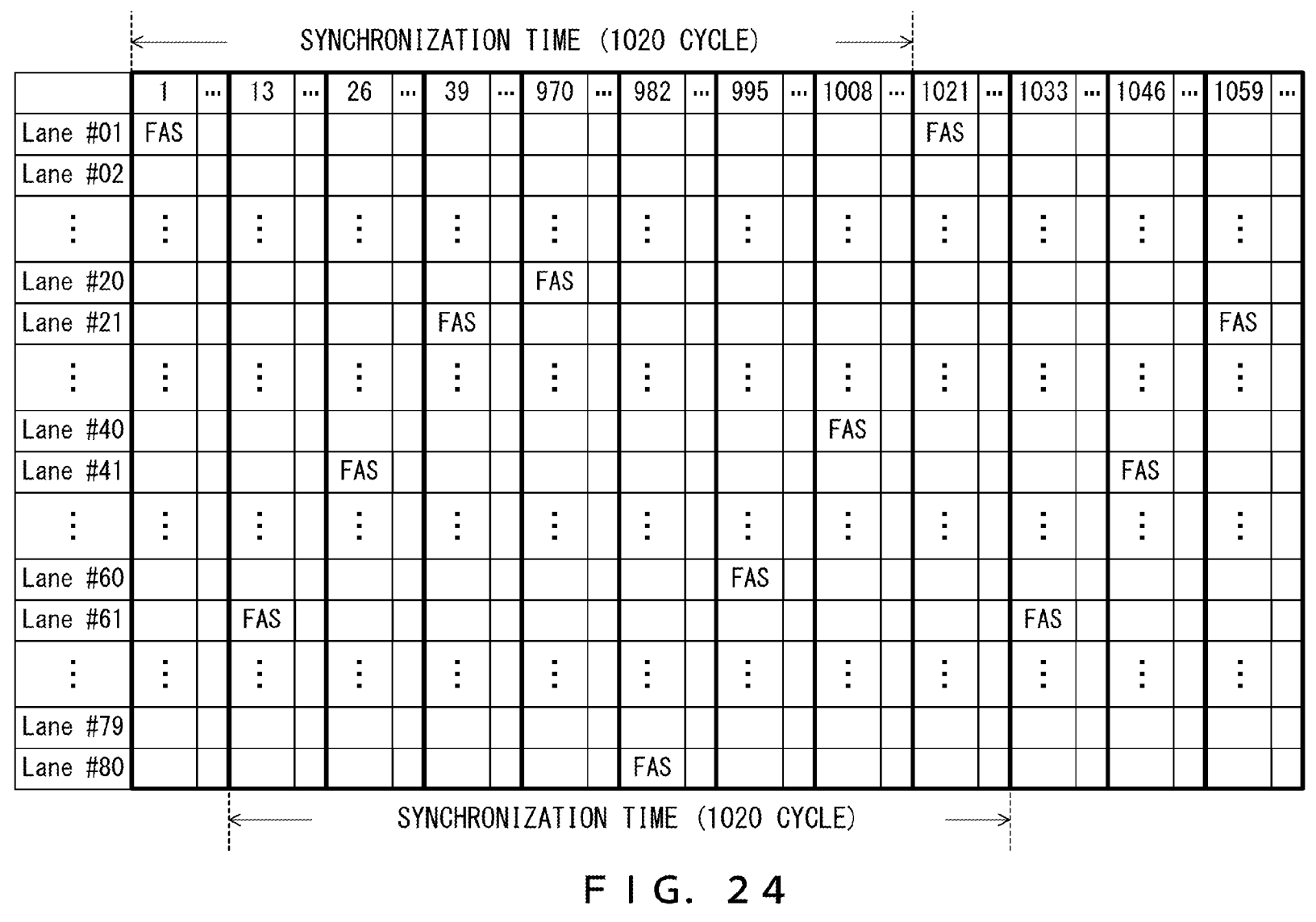

The transmission apparatus at the receiver end establishes synchronization by detecting FASs for each of the logical lanes #01 to #80. Here, FASs are inserted into each logical lane every 1020 cycles as illustrated in FIG. 24. Therefore, the transmission apparatus at the receiver end decides that the frame synchronization is established when FAS is detected every 1020 cycles in the 80 bit-sequence signals.

Figure 25:
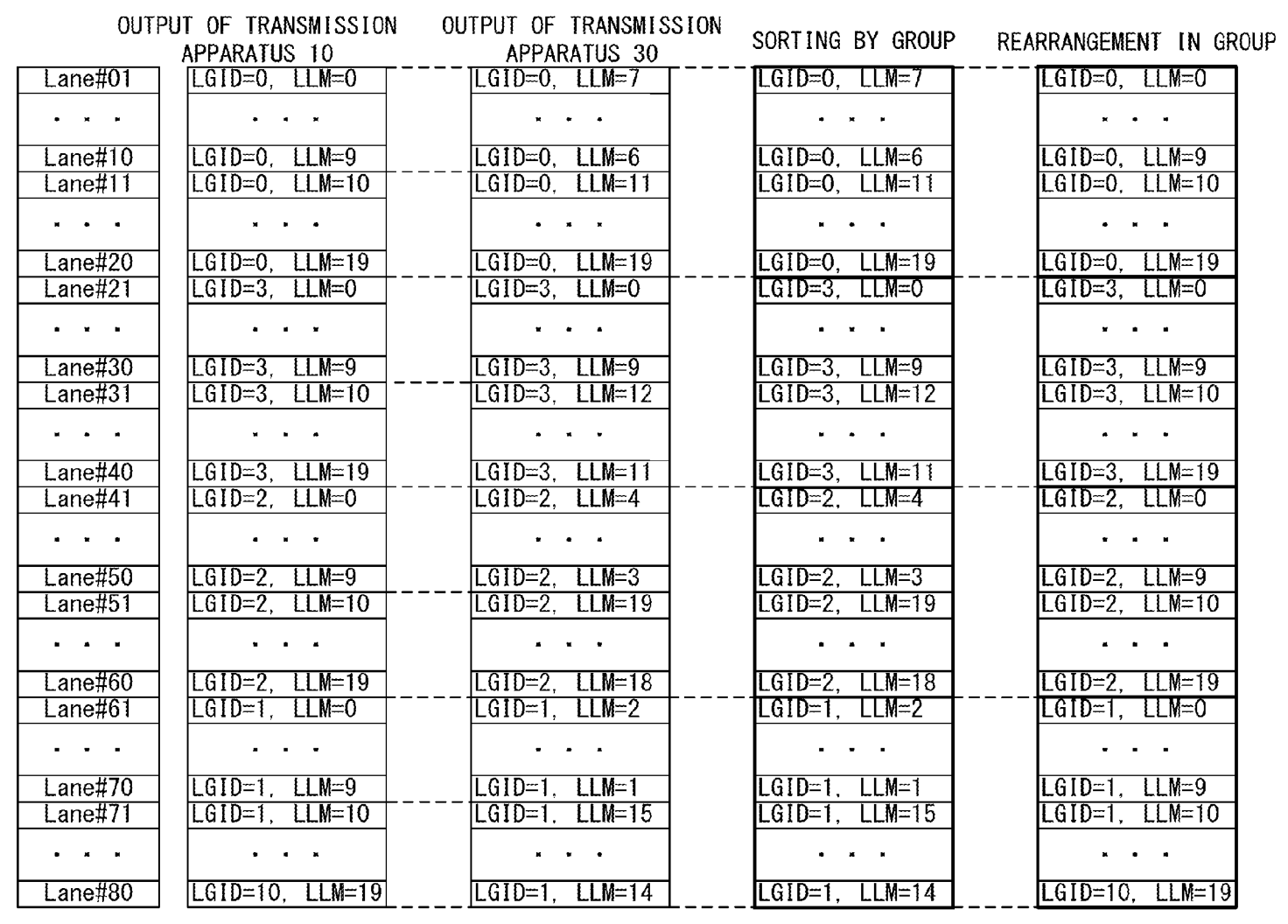

The rearrangement of the logical lanes is substantially the same as the processing by the logical lane rearranging unit 34 of the transmission apparatus 30. However, when the 80 logical lanes are grouped into four lane groups LG1 to LG4, the input logical lane signals are temporarily sorted into four lane groups based on the lane group ID. Afterwards, the rearrangement of the logical lanes is performed in each lane group. It should be noted that in FIG. 25, "LLM(mod 20)" is denoted as "LLM" to simplify the illustration in the drawing.

The skew adjuster includes inter-lane skew adjusters 35a to 35d and the inter-group skew adjuster 35e as illustrated in FIG. 26. The inter-lane skew adjusters 35a to 35d have the same configuration and the same functions.

The inter-lane skew adjuster 35a adjusts the timings of the logical lane signals #02 to #20 with respect to the logical lane signal #01. Similarly, the inter-lane skew adjuster 35b adjusts the timings of the logical lane signals #22 to #40 with respect to the logical lane signal #21; the inter-lane skew adjuster 35c adjusts the timings of the logical lane signals #42 to #60 with respect to the logical lane signal #41; and the inter-lane skew adjuster 35d adjusts the timings of the logical lane signals #62 to #80 with respect to the logical lane signal #61. Here, the logical lane signals #01 to #20 belong to the lane group LG1, the logical lane signals #21 to #40 belong to the lane group LG4, the logical lane signals #41 to #60 belong to the lane group LG3, and the logical lane signals #61 to #80 belong to the lane group LG2.

The inter-group skew adjuster 35e receives the logical lane signals #01 to #80. The inter-group skew adjuster 35e extracts one logical lane signal from each of the lane groups LG1 to LG4. Here, logical lane signals #01, #21, #41, and #61 are extracted from the lane groups LG1, LG4, LG3, and LG2, respectively. The inter-group skew adjuster 35e adjusts the skew between the extracted four logical lane signals.

For example, the inter-group skew adjuster 35e adjusts the timing s of the logical lane signals #21, #41, and #61 with respect to the logical lane signal #01. In this case, the inter-group skew adjuster 35e adjusts the timing of the logical lane signal #21 so that FAS of the logical lane signal #21 is allocated at the timing at which 38 cycles have passed from FAS of the logical lane signal #01. The timing of the logical lane signal #41 is adjusted so that FAS of the logical lane signal #41 is allocated at the timing at which 25 cycles have passed from FAS of the logical lane signal #01. Furthermore, the timing of the logical lane signal #61 is adjusted so that FAS of the logical lane signal #61 is allocated at the timing at which 12 cycles have passed from FAS of the logical lane signal #01.

The skew adjustment in each lane group is performed in advance by the inter-lane skew adjusters 35a to 35d. Therefore the inter-group skew adjuster 35e adjusts the timings of the logical lanes in each of the lane groups based on the timing adjustment result between the logical lane signals #01, #21, #41 and #61. As a result, the skew of all the logical lanes #01 to #80 is adjusted by the skew adjuster.

The configurations of the inter-lane skew adjusters 35a to 35d are the same. Therefore, when the transmission apparatus transmits an OTU frame by using 40 logical lanes #01 to #40, for example, the skew adjuster can stop the inter-lane skew adjusters 35c and 35d. In such a case, the inter-group skew adjuster 35e adjusts the skew between the logical lane signals #01 and #21.

In this manner, the transmission apparatus of the embodiment groups plural logical lanes and performs signal processing for each group. For that reason, according to the transmission apparatus of the embodiments, the period of time for processing a frame can be reduced compared with the conventional arts that do not make logical lane groups.

For example, a method to distribute an OTU frame to the logical lanes #01 to #80 without making logical lane groups by extending the method illustrated in FIG. 8 and FIG. 9 is considered. In this method, the period of time needed to allocate FASs used for the synchronization processing to all the logical lanes #01 to #80 is 4068 cycles. In addition, the period of insertion of FAS that is used in the synchronization processing in each logical lane is 4080 cycles.

On the other hand, in the configuration of the embodiment, as illustrated in FIG. 21 to FIG. 23, the period of time needed to allocate FASs used for the synchronization processing to all the logical lanes #01 to #80 is 1008 cycles. In addition, the period of insertion of FAS that is used in the synchronization processing in each logical lane is 1020 cycles. Thus, in the transmission apparatus of the embodiment, the period of time needed for the synchronization processing is shorter than the conventional arts that do not make logical lane groups.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission apparatus that receives a signal including synchronization information of a frame, the transmission apparatus comprising:
    a plurality of logical lanes respectively configured to temporarily store data, the plurality of logical lanes being grouped into a plurality of logical lane groups;
    an identification information adding circuit that adds group identification information that identifies each logical lane group and lane identification information that identifies each logical lane within a corresponding logical lane group to the frame;
    a frame divider circuit that receives the frame to which the group identification information and the lane identification information are added, and divides the received frame into frame elements;
    a selector circuit that distributes the frame elements to the plurality of logical lanes; and
    a plurality of multiplexers that are provided for respective transmission paths, each of the multiplexers multiplexing frame elements stored in corresponding logical lanes among the plurality of logical lanes and outputting the multiplexed frame elements to corresponding transmission path, wherein
    when the selector circuit distributes the frame elements to the plurality of logical lanes, the frame divider circuit associates the logical lanes with the synchronization information in accordance with the group identification information and the lane identification information.

2. The transmission apparatus according to claim 1, wherein
    the frame divider circuit divides the frame into a plurality of frame elements so that the synchronization information, the group identification information, and the lane identification formation are included in the same frame element.

3. The transmission apparatus according to claim 1, wherein
the identification information adding circuit sequentially selects one logical lane group from among the plurality of logical lane groups for each of the frames and adds the group identification information that identifies the selected logical lane group to the corresponding frames.

4. The transmission apparatus according to claim 3, wherein
the identification information adding circuit sequentially adds to frames to which the same group identification information is added, the lane identification information that specifies the logical lanes in the logical lane group identified by the group identification information.

5. The transmission apparatus according to claim 1, wherein
the frame is an OTN frame, and
when a number of logical lane groups is $2^n$, the synchronization information is FAS (Frame Alignment Signal) and the group identification information is realized by a portion of bits in MFAS (Multi Frame Alignment Signal).

6. The transmission apparatus according to claim 1, wherein
the frame is an OTN frame, and
when a number of logical lane groups is not $2^n$, the synchronization information is FAS (Frame Alignment Signal) and the group identification information is generated by the distributor.

7. A transmission system comprising:
a transmitter configured to transmit a frame including synchronization information in a specified area by using a plurality of logical lanes; and
a receiver configured to receive the frame from the transmitter, wherein
the transmitter includes:
an identification information adding circuit that adds, to the frame, group identification information that identifies a plurality of logical lane groups obtained by grouping the plurality of logical lanes and lane identification information that identifies the logical lanes in each of the logical lane groups;
a frame divider circuit that divides the frame to which the group identification information and the lane identification information are added into a plurality of frame elements;
a selector circuit that distributes the frame elements to the plurality of logical lanes; and
a plurality of multiplexers that are provided for respective transmission paths, each of the multiplexers multiplexing frame elements stored in corresponding logical lanes among the plurality of logical lanes and outputting the multiplexed frame elements to corresponding transmission path, and wherein the selector circuit sequentially distributes the frame elements of the frame to the plurality of logical lanes so that a frame element including the synchronization information of the frame are allocated to a logical lane identified by the lane identification information added to the frame in a logical lane group identified by the group identification information added to the frame, and
the receiver includes:
a reception circuit configured to guide a signal received from the transmitter to a plurality of logical lanes;
a logical lane rearranging circuit that rearranges the plurality of logical lanes, in which synchronization is established by using the synchronization information, in accordance with the group identification information and the lane identification information detected in each of the logical lanes so that an order of the plurality of logical lanes in the receiver is the same as an order of the plurality of logical lanes in the transmitter;
a skew adjustment circuit that adjusts skew in the plurality of logical lanes rearranged by the logical lane rearranging circuit in accordance with the group identification information and the lane identification information; and
a frame reproduce circuit that reproduces the frame from signals of the plurality of logical lanes in which the skew is adjusted.

8. The transmission system according to claim 7, wherein the skew adjustment circuit includes:
a plurality of inter-lane skew adjustment circuits that adjust skew among the logical lanes in each logical lane group; and
an inter-group skew adjustment circuit that adjusts skew among the logical lane groups after the skew adjustment in each logical lane group.

9. The transmission system according to claim 8, wherein
the configurations of the plurality of inter-lane skew adjustment circuits are the same, and
the skew adjustment circuit causes a number of inter-lane skew adjustment circuits to operate and causes the other inter-lane skew adjustment circuits to stop, the number being determined in accordance with the number of the logical lanes used.

10. The transmission system according to claim 7, wherein
the skew adjustment circuit includes:
an inter-group skew adjustment circuit that adjusts skew among the logical lane groups; and
a plurality of inter-lane skew adjustment circuits that adjust skew among the logical lanes in each logical lane group after the skew adjustment among the logical lane groups.

11. The transmission system according to claim 7, wherein
each of the logical lane groups includes twenty logical lanes.

* * * * *